(12) United States Patent
Nakamura

(10) Patent No.: US 8,379,319 B2
(45) Date of Patent: Feb. 19, 2013

(54) ZOOM LENS, OPTICAL APPARATUS AND METHOD FOR MANUFACTURING ZOOM LENS

(75) Inventor: Keiichi Nakamura, Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 12/917,477

(22) Filed: Nov. 1, 2010

(65) Prior Publication Data
US 2011/0102907 A1    May 5, 2011

(30) Foreign Application Priority Data

Nov. 2, 2009   (JP) ................................ 2009-251623
Oct. 21, 2010  (JP) ................................ 2010-236255

(51) Int. Cl.
    *G02B 15/14* (2006.01)
(52) U.S. Cl. ...................................................... 359/687
(58) Field of Classification Search .................. 359/676, 359/683, 687
    See application file for complete search history.

(56) References Cited

U.S. PATENT DOCUMENTS

| | | | |
|---|---|---|---|
| 6,542,312 B1 | 4/2003 | Okayama et al. | |
| 7,545,580 B2 | 6/2009 | Saruwatari | |
| 7,777,951 B2 | 8/2010 | Saruwatari | |
| 2002/0067551 A1* | 6/2002 | Ohtake | 359/687 |
| 2008/0291547 A1 | 11/2008 | Saruwatari | |
| 2009/0296230 A1* | 12/2009 | Sakai | 359/684 |

FOREIGN PATENT DOCUMENTS

| | | |
|---|---|---|
| EP | 0 841 585 A1 | 5/1998 |
| JP | 2003-140044 A | 5/2003 |
| JP | 2008-185782 A | 8/2008 |
| JP | 2009-098458 A | 5/2009 |
| WO | WO 03/038502 A1 | 5/2003 |

OTHER PUBLICATIONS

Extended European Search Report issued Apr. 11, 2011, in European Patent Application No. 10189585.2.

* cited by examiner

*Primary Examiner* — Scott J Sugarman
(74) *Attorney, Agent, or Firm* — Miles and Stockbridge P.C.

(57) ABSTRACT

The zoom lens Z1 having, in order from an object, a first lens group G1 having positive refractive power, a second lens group G2 having negative refractive power, a third lens group G3 having positive refractive power, and a fourth lens group G4 having positive refractive power, wherein the conditional expression $2.70 < TLt/(fw \times ft)^{1/2} < 3.70$ as well as the conditional expression $0.05 < D1/ft < 0.29$ are, where TLt denotes a total length of the zoom lens ZL in a telephoto end state, fw denotes a focal length of the zoom lens ZL in a wide-angle end state, ft denotes a focal length of the zoom lens ZL in a telephoto end state, and D1 denotes a thickness of the first lens group G1 on the optical axis.

26 Claims, 14 Drawing Sheets

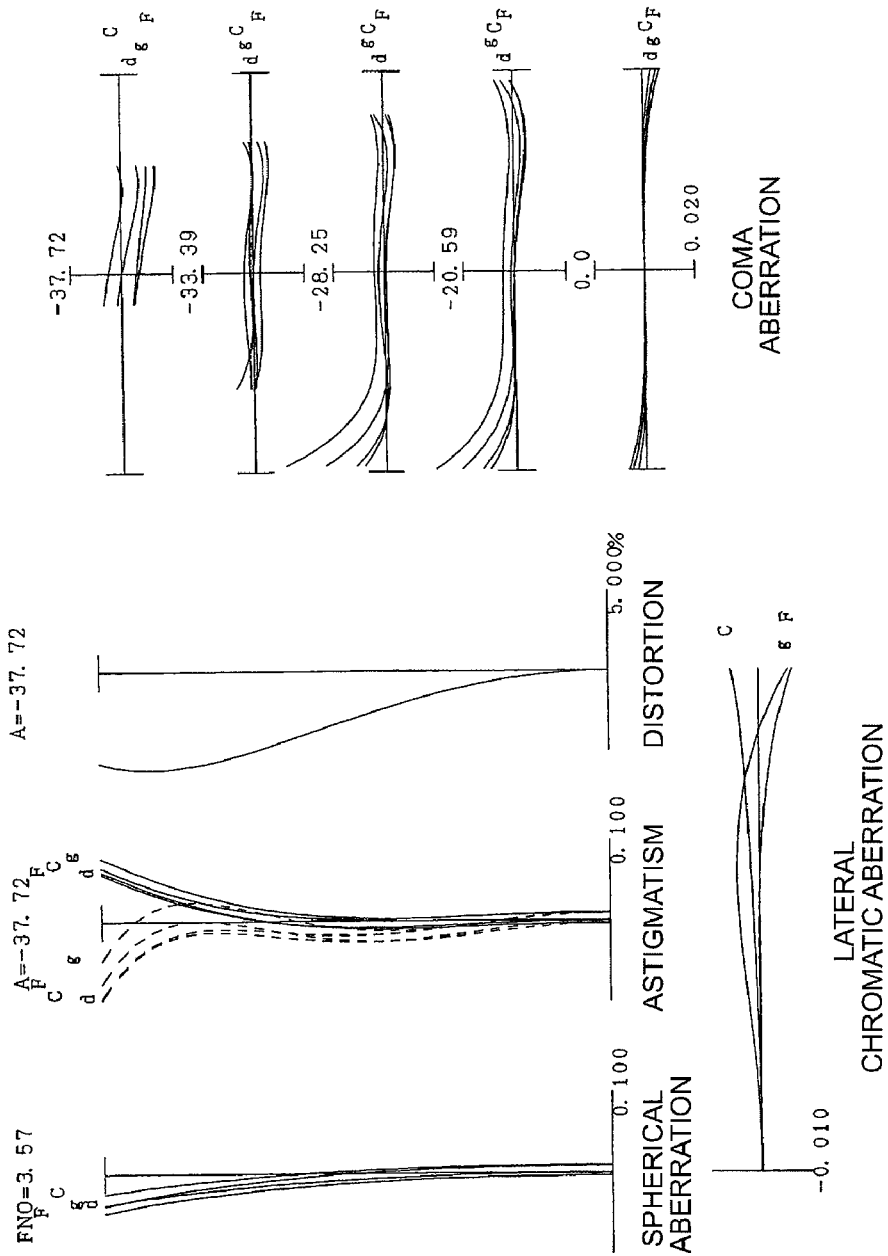

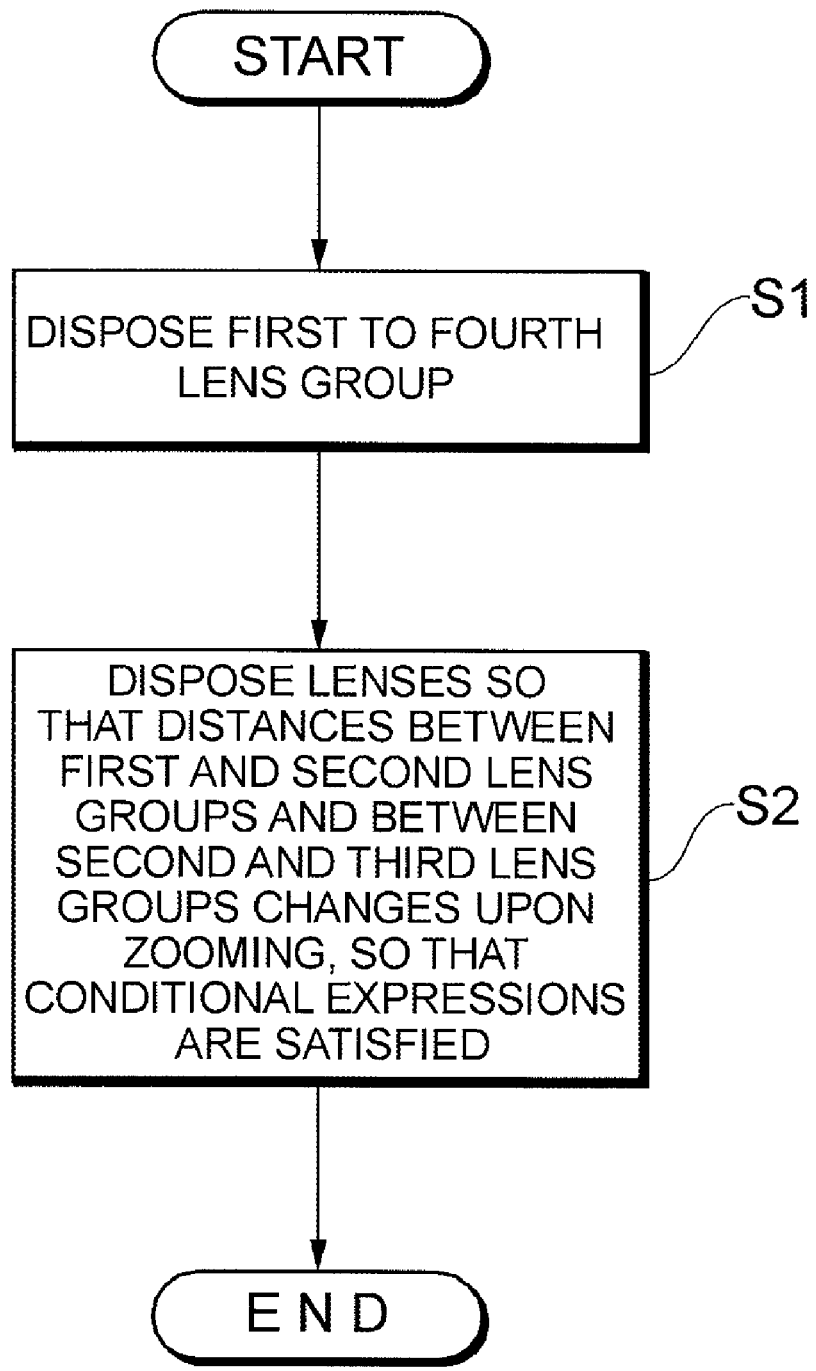

ZOOM LENS, OPTICAL APPARATUS AND METHOD FOR MANUFACTURING ZOOM LENS

INCORPORATION BY REFERENCE

This invention claims the benefit of Japanese Patent Application No. 2009-251623 and Japanese Patent Application No. 2010-236255 which are hereby incorporated by reference.

TECHNICAL FIELD AND BACKGROUND

The present invention relates to a zoom lens, an optical apparatus, and a method for manufacturing the zoom lens.

Recently demands for higher performance in all zoom areas with high zoom ratio and more compactness are increasing for imaging optical systems, such as video cameras and digital still cameras. As a zoom lens to meet these demands, a zoom lens which comprises, in order from an object, a first lens group having positive refractive power, a second lens group having negative refractive power, a third lens group having positive refractive power, and a fourth lens group having positive refractive power, and performs zooming by moving each lens group is proposed (e.g. see Japanese Laid-Open Patent Publication No. 2008-185782).

However a problem of these conventional zoom lenses is that the zoom ratio cannot be increased while maintaining excellent optical performance.

SUMMARY OF THE INVENTION

With the foregoing in view, it is an object of the present invention to provide a zoom lens and an optical apparatus, which are compact and has high optical performance, while having a relatively high zoom ratio, and a method for manufacturing the zoom lens.

To achieve this object, a zoom lens according to the present invention is a zoom lens having, in order from an object, a first lens group having positive refractive power, a second lens group having negative refractive power, a third lens group having positive refractive power, and a fourth lens group having positive refractive power, a distance between the first lens group and the second lens group being changed, and a distance between the second lens group and the third lens group being changed upon zooming from a wide-angle end state to a telephoto end state, the first lens group having three lenses, the second lens group having three lenses, the third lens group further comprises three lenses, and the following conditional expressions are satisfied:

$$2.70 < TLt/(fw \times ft)^{1/2} < 3.70 \text{ and}$$

$$0.05 < D1/ft < 0.29,$$

where TLt denotes a total length of the zoom lens in the telephoto end state, fw denotes a focal length of the zoom lens in the wide-angle end state, ft denotes a focal length of the zoom lens in the telephoto end state, and D1 denotes a thickness of the first lens group on the optical axis.

In the above zoom lens, it is preferable that the first lens group comprises, in order from the object, a cemented lens of a negative lens and a positive lens, and a positive lens.

In the above zoom lens, it is preferable that the third lens group comprises, in order from the object, a first positive lens, a second positive lens and a negative lens.

In the above zoom lens, it is preferable that the fourth lens group moves to the object side before moving to the image side, upon zooming from the wide-angle end state to the telephoto end state.

In the above zoom lens, it is preferable that the first lens group comprises, in order from the object, a cemented lens of a negative lens and a positive lens, and a positive lens, the third lens group comprises, in order from the object, a first positive lens, a second positive lens and a negative lens, and the fourth lens group moves to the object side before moving to the image side, upon zooming from the wide-angle end state to the telephoto end state.

In the above zoom lens, it is preferable that the following conditional expression is satisfied:

$$1.00 < D1/fw < 1.50.$$

In the above zoom lens, it is preferable that the following conditional expression is satisfied:

$$2.20 < TLw/(fw \times ft)^{1/2} < 2.50,$$

where TLw denotes a total length of the zoom lens in a wide-angle end state.

In the above zoom lens, it is preferable that the following conditional expression is satisfied:

$$0.13 < f3/ft < 0.23,$$

where f3 denotes a focal length of the third lens group.

In the above zoom lens, it is preferable that the following conditional expression is satisfied:

$$0.50 < R71/R81 < 2.00,$$

where R71 denotes a radius of curvature at the object side of the first positive lens in the third lens group, and R81 denotes a radius of curvature at the object side of the second positive lens in the third lens group.

In the above zoom lens, it is preferable that the negative lens closest to the object in the second lens group is an aspherical lens.

In the above zoom lens, it is preferable that the following conditional expression is satisfied:

$$0.10 < (-f2)/f1 < 0.25,$$

where f2 denotes a focal length of the second lens group, and f1 denotes a focal length of the first lens group.

In the above zoom lens, it is preferable that the following conditional expression is satisfied:

$$2.00 < f4/fw < 4.00,$$

where f4 is a focal length of the fourth lens group.

In the above zoom lens, it is preferable that the third lens group is constituted by the first positive lens as a front group having positive power, and the second positive lens and the negative lens as a rear group having negative power, and the following conditional expression is satisfied:

$$0.50 < f3a/(-f3b) < 1.00,$$

where f3a denotes a focal length of the front group, and f3b denotes a focal length of the rear group.

In the above zoom lens, it is preferable that the third lens group has an aspherical surface.

In the above zoom lens, it is preferable that the distance between the first lens group and the second lens group increases, and the distance between the second lens group and the third lens group decreases, upon zooming from the wide-angle end state to the telephoto end state.

In the above zoom lens, it is preferable that an aperture stop is disposed between the second lens group and the third lens group.

In the above zoom lens, it is preferable that the aperture stop moves together with the third lens group upon zooming.

In the above zoom lens, it is preferable that the second lens group comprises, in order from the object, a first negative lens, a second negative lens and a positive lens.

In the above zoom lens, it is preferable that the third lens group comprises, in order from the object, a first positive lens, a second positive lens and a negative lens, and the second positive lens and the negative lens are cemented to be a cemented lens.

In the above zoom lens, it is preferable that the fourth lens group is constituted by a single lens.

An optical apparatus according to the present invention is an optical apparatus comprising a zoom lens for forming an image of an object on a predetermined surface, this zoom lens being the zoom lens according to the present invention.

A method for manufacturing a zoom lens according to the present invention is a method for manufacturing a zoom lens having, in order from an object, a first lens group, a second lens group, a third lens group and a fourth lens group, the method being executed such that: three lenses are disposed as the first lens group, three lenses are disposed as the second lens group, and three lenses are disposed as the third lens group, and each lens is disposed so that the first lens group has positive refractive power, the second lens group has negative refractive power, the third lens group has positive refractive power, and the fourth lens group has positive refractive power, each lens group is disposed so that the distance between the first lens group and the second lens group changes, and the distance between the second lens group and the third lens group changes upon zooming from a wide-angle end state to a telephoto end state, and each lens group is disposed so that the following conditional expressions are satisfied:

$$2.70 < TLt/(fw \times ft)^{1/2} < 3.70 \text{ and}$$

$$0.05 < D1/ft < 0.29,$$

where TLt denotes a total length of the zoom lens in the telephoto end state, fw denotes a focal length of the zoom lens in the wide-angle end state, ft denotes a focal length of the zoom lens in the telephoto end state, and D1 denotes a thickness of the first lens group on the optical axis.

In the above method for manufacturing a zoom lens, it is preferable that the first lens group comprises, in order from the object, a cemented lens of a negative lens and a positive lens, and a positive lens, the third lens group comprises, in order from the object, a first positive lens, a second positive lens and a negative lens, and the fourth lens group moves to the object side before moving to the image side upon zooming from the wide-angle end state to the telephoto end state.

In the above method for manufacturing a zoom lens, it is preferable that the following conditional expression is satisfied:

$$2.20 < TLw/(fw \times ft)^{1/2} < 2.50,$$

where TLw denotes a total length of the zoom lens in the wide-angle end state.

In the above method for manufacturing a zoom lens, it is preferable that the following conditional expression is satisfied:

$$0.13 < f3/ft < 0.23,$$

where f3 denotes the focal length of the third lens group.

In the above method for manufacturing a zoom lens, it is preferable that the following conditional expression is satisfied:

$$0.50 < R71/R81 < 2.00,$$

where R71 denotes a radius of curvature at the object side of the first positive lens in the third lens group, and R81 denotes a radius of curvature at the object side of the second positive lens in the third lens group.

ADVANTAGEOUS EFFECTS OF THE INVENTION

According to the present invention, compactness and high optical performance can be implemented while having a relatively high zoom ratio.

Further scope of applicability of the present invention will become apparent from the detailed description given hereinafter. However, it should be understood that the detailed description and specific examples, while indicating preferred embodiments of the invention, are given by way of illustration only, since various Changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2A shows graphs showing various aberrations of the zoom lens according to First Example upon focusing on infinity in the wide-angle end state.

FIG. 8 is a flow chart depicting a method for manufacturing the zoom lens.

DESCRIPTION OF THE PREFERRED EMBODIMENTS

Figure 7B:
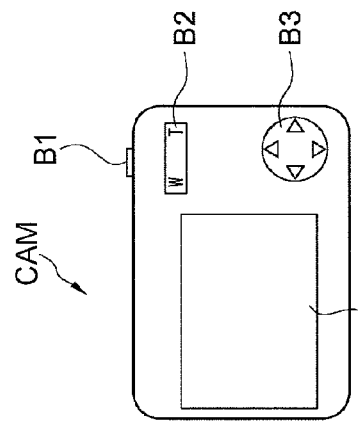
FIG. 7B is a rear view of a digital still camera.
Figure 7A:
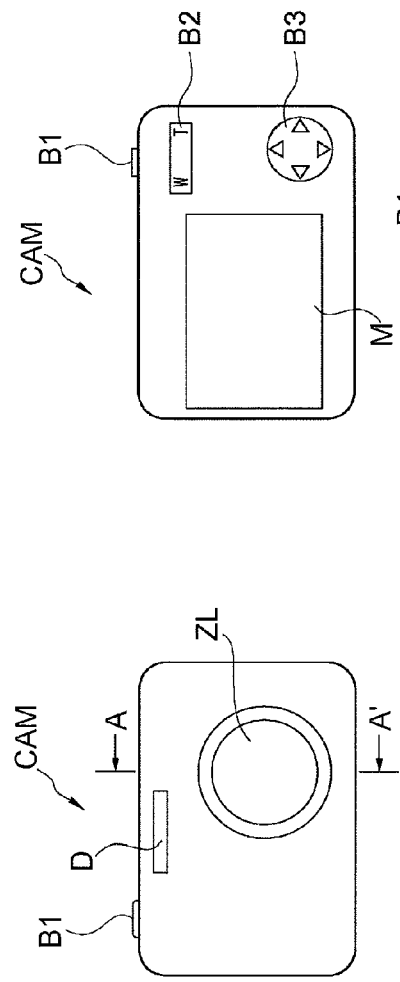
FIG. 7A is a front view of a digital still camera.
Figure 7C:
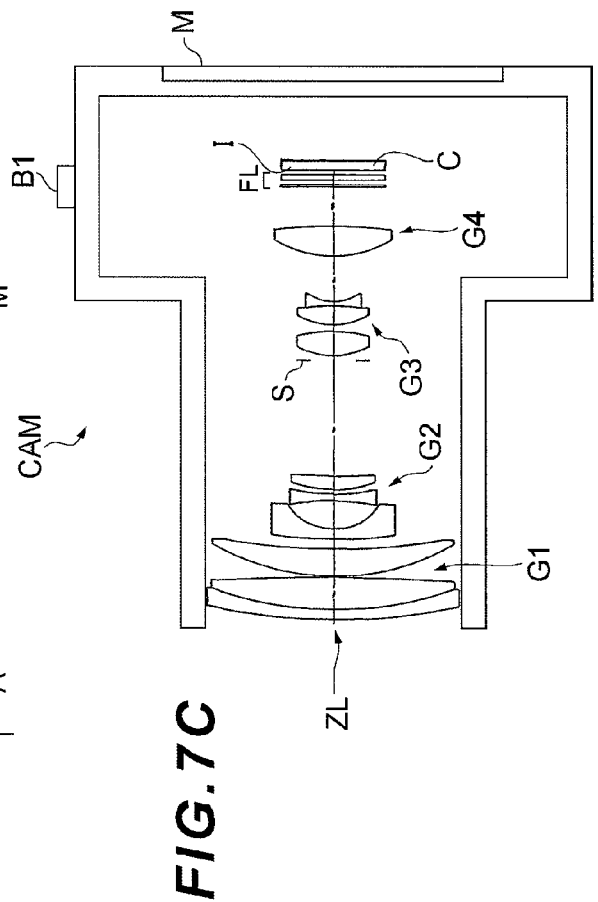
FIG. 7C is a cross-sectional view sectioned along the arrow A-A' in FIG. 7A.

Preferred embodiments of the present invention will now be described with reference to the drawings. FIG. 7 shows a digital still camera CAM having a zoom lens according to the present invention. In FIG. 7A shows a front view of the digital still camera CAM, FIG. 7B shows a rear view of the digital still camera CAM, and FIG. 7C shows a cross-sectional view sectioned along the arrow A-A' in FIG. 7A.

In the digital still camera CAM shown in FIG. 7, if a power button, which is not illustrated, is pressed, a shutter, which is not illustrated, of a camera lens (ZL) is released, and lights from an object are collected by the camera lens (ZL), and form an image on a picture element C (e.g. CCD and CMOS), which is disposed on the image plane I. The object image formed on the picture element C is displayed on a liquid crystal monitor M disposed behind the digital still camera CAM. The user determines the composition of the object image while viewing a liquid crystal monitor M, then presses the release button B1 to photograph the object image by the picture element C, and stores it in memory, which is not illustrated.

The camera lens is constituted by a later mentioned zoom lens ZL according to the embodiment. In the digital still camera CAM, an auxiliary light emitting portion D, which emits light when the object is dark, a wide (W)—Tele (T) button B2 for zooming the camera lends (zoom lens ZL) from the wide-angle end state (W) to the telephoto end state (T), and a function button B3 which is used for setting various conditions for the digital still camera CAM, are disposed.

The zoom lens ZL comprises, in order from the object, a first lens group G1 having positive refractive power, a second lens group G2 having negative refractive power, a third lens group G3 having positive refractive power, and a fourth lens group G4 having positive refractive power. The first to the fourth lens groups G1 to G4 move along the optical axis respectively (e.g. see FIG. 1) upon zooming from a wide-angle end state to a telephoto end state, whereby the distance between the first lens group G1 and the second lens group G2 changes, and at this time, the distance between the second lens group G2 and the third lens group G3 changes, and the fourth lens group G4 moves to the object side once, then moves to the image side. A filter group FL constituted by a low pass filter or infrared cut-filter cut-off filter is disposed between the zoom lens ZL and the image plane I.

The first lens group G1 further comprises, in order from the object, a cemented lens of a negative lens and a positive lens, and a positive lens. The second lens group G2 further comprises three lenses. The third lens group G3 further comprises, in order from the object, a first positive lens, a second positive lens and a negative lens.

In the zoom lens ZL having this configuration, it is preferable that the conditions expressed by the following conditional expression (1) and conditional expression (2) are satisfied:

$$2.70 < TLt/(fw \times ft)^{1/2} < 3.70 \tag{1}$$

$$0.05 < D1/ft < 0.29 \tag{2}$$

where TLt denotes a total length of the zoom lens ZL in the telephoto end state, fw denotes a focal length of the zoom lens ZL in the wide-angle end state, ft denotes a focal length of the zoom lens ZL in the telephoto end state, and D1 denotes a thickness of the first lens group G1 on the optical axis. By this, the total optical length can be decreased and each aberration can be corrected well, so a zoom lens ZL which is compact and has high optical performance while having a zoom ratio of about ×10, and an optical apparatus (digital still camera CAM) having this zoom lens ZL, can be implemented.

Here the conditional expression (1) specifies the total length of the zoom lens ZL in the telephoto end state. If the conditional exceeds the upper limit value of the conditional expression (1), the total length becomes too long, and compactness cannot be implemented. In order to prevent this, the power of the third lens group G3 must be increased, which worsens the spherical aberration and chromatic aberration. If the condition is below the lower limit value of the conditional expression (1), on the other hand, the power of the first lens group G1 increases too much, which makes it difficult to correct curvature of field.

If the lower limit value of the conditional expression (1) is 2.75, or the upper limit value of the conditional expression (1) is 3.67, the effect of the present invention can be exhibited better.

The conditional expression (2) specifies the relationship between the thickness of the first lens group G1 on the optical axis and the focal length of the zoom lens in the telephoto end state. If the condition exceeds the upper limit value of the conditional expression (2), the thickness of the first lens group G1 increases, and compactness cannot be implemented when the lenses are retracted, and it is difficult to correct astigmatism and curvature of field. If the condition is below the lower limit value of the conditional expression (2), on the other hand, the thickness in the retracted state decreases, but it is difficult to correct astigmatism, curvature of field and lateral chromatic aberration in the wide-angle end state.

If the lower limit value of the conditional expression (2) is 0.10, or the upper limit value of the conditional expression (2) is 0.25, the effect of the present invention can be exhibited better. If the upper limit value of the conditional expression (2) is 0.21, the effect of the present invention can be exhibited better.

In this zoom lens ZL, it is preferable that the condition expressed by the following conditional expression (3) is satisfied:

$$1.00 < D1/fw < 1.50 \tag{3}$$

The conditional expression (3) specifies the relationship between the thickness of the first lens group G1 on the optical axis and the focal length of the zoom lens in the wide-angle end state. If the condition exceeds the upper limit value of the conditional expression (3), the thickness of the first lens group G1 increases, and compactness cannot be implemented when the lenses are retracted, and it is difficult to correct astigmatism and curvature of field. If the condition is below the lower limit value of the conditional expression (3), on the other hand, the thickness in the retracted state decreases, but it is difficult to correct astigmatism, curvature of field and lateral chromatic aberration in the wide-angle end state.

If the lower limit value of the conditional expression (3) is 1.05, or the upper limit value of the conditional expression (3) is 1.35, the effect of the present invention can be exhibited better.

In this zoom lens ZL, it is preferable that the condition expressed by the following conditional expression (4) is satisfied:

$$2.20 < TLw/(fw \times ft)^{1/2} < 2.50 \tag{4}$$

where TLw denotes a total length of the zoom lens ZL in the wide-angle end state.

The conditional expression (4) specifies the total length of the zoom lens ZL in the wide-angle end state. If the condition exceeds the upper limit value of the conditional expression (4), it is difficult to correct distortion in the wide-angle end state, and the total length becomes too long, which increases the diameter of the front cell, and makes it impossible to implement compactness. If the condition is below the lower limit value of the conditional expression (4), on the other hand, the total length becomes too short, which makes it difficult to correct distortion and curvature of field.

If the lower limit value of the conditional expression (4) is 2.25, or the upper limit value of the conditional expression (4) is 2.45, the effect of the present invention can be exhibited better.

In this zoom lens ZL, it is preferable that the condition expressed by the following conditional expression (5) is satisfied:

$$0.13 < f3/ft < 0.23 \quad (5)$$

where f3 denotes a focal length of the third lens group G3.

The conditional expression (5) specifies the relationship of the focal length of the third lens group G3 and the focal length of the zoom lens ZL in the telephoto end state. If the condition exceeds the upper limit value of the conditional expression (5), the power of the third lens group G3 becomes too weak, which makes it difficult to correct coma aberration. Furthermore, the moving amount increases and the total length becomes too long, which makes downsizing impossible. If the condition is below the lower limit value of the conditional expression (5), on the other hand, the power of the third lens group G3 becomes too strong, and spherical aberration in the telephoto end state is excessively corrected by the third lens group G3, which makes it difficult to correct coma aberration and curvature of field.

If the lower limit value of the conditional expression (5) is 0.16, or the upper limit value of the conditional expression (5) is 0.21, the effect of the present invention can be exhibited better.

In this zoom lens ZL, it is preferable that the condition expressed by the following conditional expression (6) is satisfied:

$$0.50 < R71/R81 < 2.00 \quad (6)$$

where R71 denotes a radius of curvature at the object side of the first positive lens in the third lens group G3, and R81 denotes a radius of curvature at the object side of the second positive lens in the third lens group G3.

The conditional expression (6) specifies the relationship of radius of curvature of the positive lenses in the third lens group G3. If the condition exceeds the upper limit value of the conditional expression (6), the power of the first positive lens in the third lens group G3 becomes too weak, which makes it difficult to correct spherical aberration. If the condition is below the lower limit value of the conditional expression (6), on the other hand, the power of the first positive lens in the third lens group G3 becomes too strong, which makes it difficult to correct spherical aberration.

If the lower limit value of the conditional expression (6) is 0.7, or the upper limit value of the conditional expression (6) is 1.5, the effect of the present invention can be exhibited better. If the lower limit value of the conditional expression (6) is 0.85, or the upper limit value of the conditional expression (6) is 1.0, the effect of the present invention can be exhibited to the maximum.

In this zoom lens ZL, it is preferable that the negative lens closest to the object in the second lens group G2 is an aspherical lens. By using an aspherical surface for the negative lens, it becomes easier to correct astigmatism, curvature of field and coma aberration in the wide-angle end state.

In this zoom lens ZL, it is preferable that the condition expressed by the following conditional expression (7) is satisfied:

$$0.10 < (-f2)/f1 < 0.25 \quad (7)$$

where f2 denotes a focal length of the second lens group G2, and f1 denotes a focal length of the first lens group G1.

The conditional expression (7) specifies the relationship of the focal lengths of the first lens group G1 and the second lens group G2. If the condition exceeds the upper limit value of the conditional expression (7), the power of the second lens group G2 becomes too strong, which makes it difficult to correct astigmatism and curvature of field. If the condition is below the lower limit value of the conditional expression (7), on the other hand, the power of the first lens group G1 increases, which makes it difficult to correct the spherical aberration in the telephoto end state. Furthermore, the power of the second lens group decreases, so the total length increases as the zoom ratio increases.

If the lower limit value of the conditional expression (7) is 0.15, or the upper limit value of the conditional expression (7) is 0.20, the effect of the present invention can be exhibited better. If the upper limit value of the conditional expression (7) is 0.18, the effect of the present invention can be exhibited to the maximum.

In this zoom lens ZL, it is preferable that the condition expressed by the following conditional expression (8) is satisfied:

$$2.00 < f4/fw < 4.00 \quad (8)$$

where f4 denotes a focal length of the fourth lens group G4.

The conditional expression (8) specifies the relationship of the focal length of the fourth lens group G4 and the focal length of the zoom lens in the wide-angle end state. If the condition exceeds the upper limit value of the conditional expression (8), the total length becomes too long, and compactness cannot be implemented. In order to prevent this, the power of the third lens group G3 must be increased, which makes it difficult to correct the spherical aberration and chromatic aberration in the wide-angle end state. If the condition is below the lower limit value of the conditional expression (8), on the other hand, it is difficult to correct curvature of field and coma aberration in the wide-angel end state and to correct coma aberration in the telephoto end state.

If the lower limit value of the conditional expression (8) is 2.50, or the upper limit value of the conditional expression (8) is 3.50, the effect of the present invention can be exhibited better.

In the zoom lens ZL, it is preferable that the third lens group G3 is constituted by the first positive lens as a front group having positive power, and the second positive lens and a negative lens as a rear group having negative power, and the following conditional expression (9) is satisfied:

$$0.50 < f3a/(-f3b) < 1.00 \quad (9)$$

where f3a denotes a focal length of the front group, and f3b denotes a focal length of the rear group.

The conditional expression (9) specifies the relationship of the focal lengths of the front group and the rear group of the third lens group G3. If the condition exceeds the upper limit value of the conditional expression (9), the power of the rear group of the third lens group G3 becomes low, which makes it difficult to correct spherical aberration and chromatic aberration. If the condition is below the lower limit value of the conditional expression (9), on the other hand, the power of the front group becomes low, which makes it difficult to correct spherical aberration. Furthermore, the power of the rear group becomes high, which makes it difficult to correct coma aberration.

If the lower limit value of the conditional expression (9) is 0.55, or the upper limit value of the conditional expression (9) is 0.80, the effect of the present invention can be exhibited better.

In this zoom lens ZL, it is preferable that the third lens group G3 has an aspherical surface. If the third lens group G3 has at least one aspherical surface, spherical aberration can be corrected well, and abaxial astigmatism and coma aberration can also be corrected well.

In this zoom lens ZL, it is preferable that the distance between the first lens group G1 and the second lens group G2 increases, and at the same time, the distance between the second lens group G2 and the third lens group G3 decreases upon zooming from the wide-angle end state to the telephoto end state.

Now a method for manufacturing the zoom lens ZL having the above mentioned configuration will be described with reference to FIG. 8. First the first lens group G1, second lens group G2, third lens group G3 and fourth lens group G4 of the present embodiment are assembled in a cylindrical lens barrel (step S1). At this time, three lenses are disposed as the first lens group, three lenses are disposed as the second lens group, and three lenses are disposed as the third lens group, and each lens is disposed so that the first lens group has positive refractive power, the second lens group has negative refractive power, the third lens group has positive refractive power, and the fourth lens group has positive refractive power. In the second step, each lens group is disposed so that the distance between the first lens group and the second lens group changes, and the distance between the second lens group and the third lens group changes upon zooming from the wide-angle end state to the telephoto end state, so that the following conditional expressions (1) and (2) are satisfied:

$$2.70 < TLt/(fw \times ft)^{1/2} < 3.70 \quad (1)$$

$$0.05 < D1/ft < 0.29 \quad (2)$$

where TLt denotes a total length of the zoom lens in the telephoto end state, fw denotes a focal length of the zoom lens in the wide-angle end state, ft denotes a focal length of the zoom lens in the telephoto end state, and D1 denotes a thickness of the first lens group on the optical axis.

When each lens is assembled in the lens barrel, each lens group may be assembled in the lens barrel one at a time in order along the optical axis, or a part or all of the lens group may be integratedly held on a holding member, and then assembled in the lens barrel. After assembling each lens group in the lens barrel like this, it is checked whether the object image is formed in a state where each lens group is assembled in the lens barrel, that is, whether the center of each lens group is aligned, and after confirming whether the image is formed, various operations of the zoom lens ZL are checked.

Examples of the various operations are a zoom operation in which lens groups which perform zooming (first to fourth lens groups G1 to G4 in this embodiment) move along the optical axis, a focusing operation in which a lens group, which performs focusing from an object at a long distance to an object at a short distance (fourth lens group G4 in this embodiment), moves along the optical axis, and a hand motion blur correction operation in which at least a part of the lenses move, so as to have a component orthogonal to the optical axis. In the present embodiment, upon zooming from the wide-angle end state to the telephoto end state, the distance between the first lens group G1 and the second lens group G2 increases, and at the same time, the distance between the second lens group G2 and the third lens group G3 decreases. The sequence of checking the various operations is arbitrary. According to this manufacturing method, a zoom lens ZL, which is compact and has high optical performance while having about an ×10 of zoom ratio, can be implemented.

First Example

Figure 1:
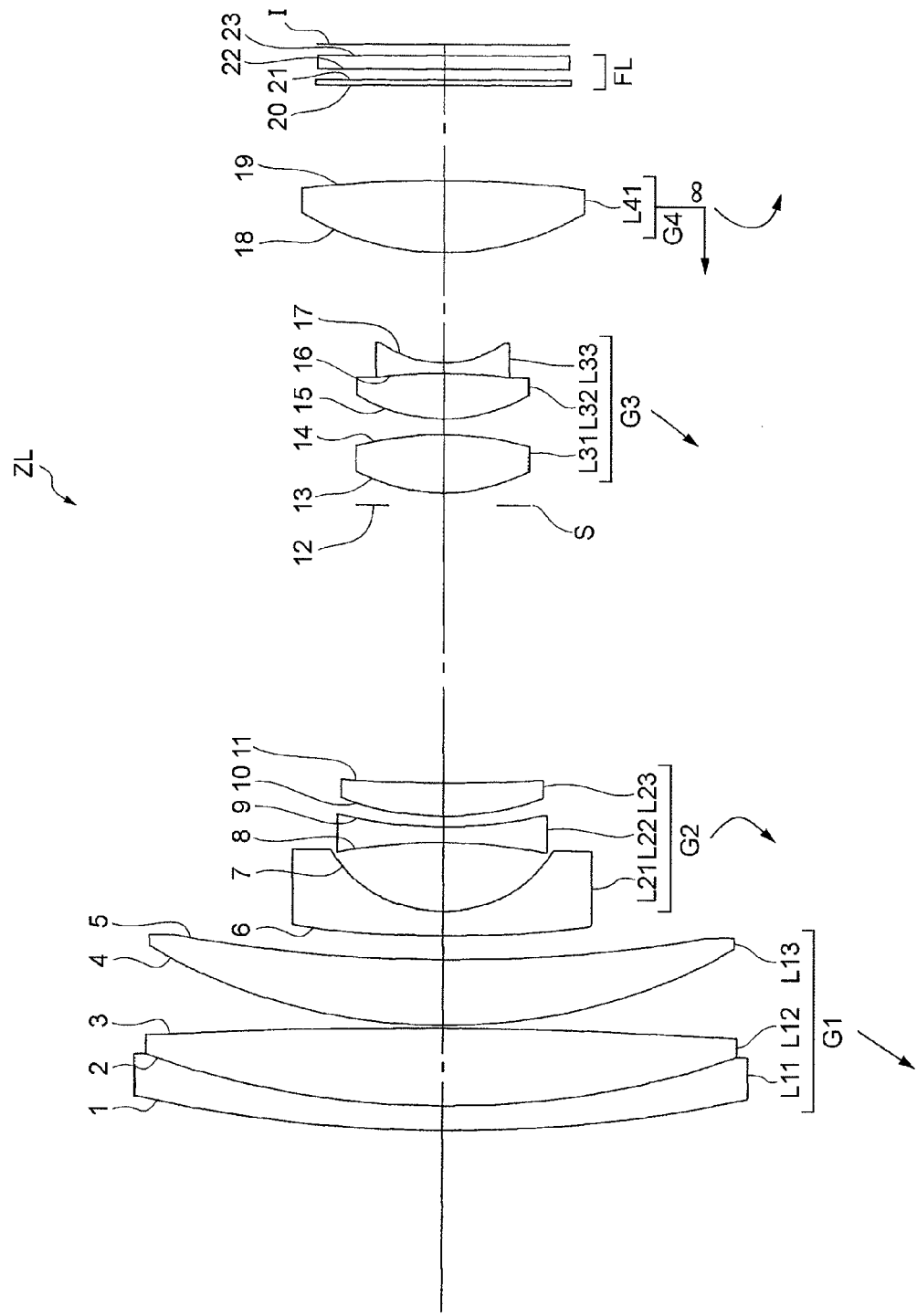
FIG. 1 is a diagram depicting a configuration and zoom locus of a zoom lens according to First Example.

First Example will now be described with reference to FIG. 1, FIG. 2 and Table 1. FIG. 1 is a diagram depicting a configuration and zoom locus of a zoom lens according to First Example. The zoom lens ZL according to First Example comprises, in order from an object, a first lens group G1 having positive refractive power, a second lens group G2 having negative refractive power, a stop S, a third lens group G3 having positive refractive power, and a fourth lens group G4 having positive refractive power.

The first lens group G1 further comprises, in order from the object, a negative meniscus lens L11 having a convex surface facing the object, a biconvex positive lens L12, and a positive meniscus lens L13 having a convex surface facing the object, and the negative meniscus lens L11 and the positive lens L12 are cemented. The second lens group G2 further comprises, in order from the object, a negative meniscus lens L21 having a convex surface facing the object, a biconcave negative lens L22 and a positive meniscus lens L23 having a convex surface facing the object, and both lens surfaces of the negative meniscus lens L21 are aspherical. The third lens group G3 further comprises, in order from the object, a biconvex first positive lens L31, a biconvex second positive lens L32 and a biconcave negative lens L33, and the second positive lens L32 and the negative lens 33 are cemented. In other words, the third lens group G3 is constituted by the first positive lens L31 as a front group having positive power, and the second positive lens L32 and negative lens L33 as a rear group having negative power. Both lens surfaces of the first positive lens L31 are aspherical. The fourth lens group G4 is constituted by only the biconvex positive lens L41, and focusing from an object at infinity to an object at a finite distance is performed by moving the fourth lens group G4 along the optical axis.

Stop S is disposed near the object side of the first positive lens L31, which is disposed closest to the object in the third lens group G3, and moves together with the third lens group G3 upon zooming from the wide-angle end state to the telephoto end state. The filter group FL disposed between the fourth lens group G4 and the image plane I is constituted by a low pass filter or infrared cut-off filter.

In the zoom lens ZL having this configuration, the first to fourth lens groups G1 to G4 move along the optical axis upon zooming from the wide-angle end state to the telephoto end state, whereby the distance between the first lens group G1 and the second lens group G2 increases, the distance between the second lens group G2 and the third lens group G3 decreases, and the distance between the third lens group G3 and the fourth lens group G4 increases. At this time, the first lens group G1 simply moves to the object side, the second lens group G2 moves to the image side once, then moves to the object side, the third lens group G3 simply moves to the object side, and the fourth lens group G4 moves to the object side once, then moves to the image side.

Table 1 to Table 3 shown below are tables listing the values of data on the zoom lenses according to First Example to Third Example. In General Data in each table, f is a focal length, FNO is an F number, ω is a half angle of view (maximum incident angle: unit is "°"), Y is image height, Bf is back focus (air conversion length), and TL is total lens length (air conversion length). TL' is an actual dimension of the total lens length, and is used for calculating the conditional expression (1) and conditional expression (4). In [Lens Data], the first column N shows a sequence of the lens surface counted from the object side, the second column R shows a radius of curvature of the lens surface, the third column D shows a distance between the lens surfaces, the fourth column nd shows a refractive index at d-line (wavelength: λ=587.6 nm), and the fifth column νd shows an Abbe number at d-line (wavelength: λ=587.6 nm). "★" attached at the right in the first column indicates that this lens surface is aspherical. The refractive index of air, "1.000000", is omitted, and the radius of curvature "∞" indicates a plane.

In [Aspherical Data], the aspherical coefficient is given by the following conditional expression (10), where y denotes the height of a direction perpendicular to the optical axis, X(y) denotes a distance from a tangential plane at a vertex of the aspherical surface to the position on the aspherical surface at height y along the optical axis, R denotes a radius of curvature (paraxial radius of curvature) of a reference spherical surface, κ is a conical coefficient, and An is an aspherical coefficient in degree n (n=4, 6, 8 10). In each example, the aspherical coefficient A2 of degree 2 is 0, which is omitted here. In [Aspherical Data], "E-n" means "×10$^{-n}$".

$$X(y) = (y^2/R)/\{1 + (1 - \kappa y^2/R^2)^{1/2}\} + A4xy^4 + A6xy^6 + A8xy^8 + A10xy^{10} \quad (10)$$

In [Variable Distance Data], f is a focal length, and a variable distance between each lens group are shown. "mm" is normally used for the unit of focal length f, radius of curvature R, surface distance D and other lengths in all data values herein below, but another appropriate unit may be used instead, since an equivalent optical performance is obtained even if an optical system is proportionally expanded or proportionally reduced. The same symbols as this example are used in the data values in Second Example and Third Example, to be described below.

Table 1 shows each data of First Example. The surface numbers 1 to 23 in Table 1 correspond to surfaces 1 to 23 in FIG. 1, and the group numbers G1 to G4 in Table 1 correspond to each lens group G1 to G4 in FIG. 1. In First Example, the sixth lens surface, seventh lens surface, thirteenth lens surface and fourteenth lens surface are formed to be aspherical.

TABLE 1

[General Data]
Zoom ratio = 9.45

|  | Wide-angle | Intermediate | Telephoto |
|---|---|---|---|
| f = | 5.55 | 27.07 | 52.43 |
| FNO = | 3.58 | 4.89 | 5.98 |
| ω = | 37.72 | 8.55 | 4.35 |
| Y = | 4.05 | | |
| Bf = | 4.82718 | 10.17393 | 4.63761 |
| TL = | 40.40998 | 53.63453 | 61.25781 |
| TL' = | 40.65174 | 53.87630 | 61.49957 |

[Lens Data]

| N | R | D | nd | νd |
|---|---|---|---|---|
| 1 | 52.8697 | 0.9000 | 1.922860 | 20.88 |
| 2 | 32.5290 | 2.9000 | 1.497820 | 82.56 |
| 3 | -188.7111 | 0.1000 | | |
| 4 | 21.4921 | 2.4500 | 1.729157 | 54.68 |
| 5 | 55.4898 | (d5) | | |
| 6* | 62.3072 | 0.9000 | 1.851350 | 40.04 |
| 7* | 5.2329 | 2.5500 | | |

TABLE 1-continued

| 8 | -20.6162 | 0.6000 | 1.816000 | 46.62 |
|---|---|---|---|---|
| 9 | 15.8728 | 0.4000 | | |
| 10 | 10.5118 | 1.2500 | 1.945950 | 17.98 |
| 11 | 54.1423 | (d11) | | |
| 12 | ∞ | 0.4500 | Stop S | |
| 13* | 6.0329 | 2.2000 | 1.592520 | 67.87 |
| 14* | -11.9281 | 0.6000 | | |
| 15 | 6.1080 | 1.7000 | 1.696797 | 55.53 |
| 16 | -19.4100 | 0.4000 | 1.903660 | 31.27 |
| 17 | 3.8342 | (d17) | | |
| 18 | 9.8693 | 2.7000 | 1.487490 | 70.45 |
| 19 | -45.6869 | (d19) | | |
| 20 | ∞ | 0.2100 | 1.516330 | 64.14 |
| 21 | ∞ | 0.3900 | | |
| 22 | ∞ | 0.5000 | 1.516330 | 64.14 |
| 23 | ∞ | | | |

[Aspherical Data]

Sixth surface

κ = 1.0000, A4 = 2.54930E-04, A6 = -3.02400E-06,
A8 = 0.00000E+00, A10 = 0.00000E+00

Seventh surface

κ = 0.7429, A4 = 6.20780E-04, A6 = 3.03310E-05,
A8 = 6.46920E-08, A10 = 7.44860E-08

Thirteenth surface

κ = 0.1382, A4 = -3.24370E-04, A6 = -1.44810E-06,
A8 = 0.00000E+00, A10 = 0.00000E+00

Fourteenth surface

κ = 1.0000, A4 = 1.39690E-04, A6 = 0.00000E+00,
A8 = 0.00000E+00, A10 = 0.00000E+00

[Variable Distance Data]

|  | Wide-angle | Intermediate | Telephoto |
|---|---|---|---|
| f = | 5.5544 | 27.0715 | 52.4279 |
| d5 = | 0.9000 | 15.8980 | 20.3998 |
| d11 = | 10.4500 | 1.5465 | 0.7501 |
| d17 = | 4.1328 | 5.9161 | 15.3703 |
| d19 = | 3.5490 | 8.9022 | 3.3954 |

[Zoom Lens Group Data]

| Group number | First surface of group | Focal length of group |
|---|---|---|
| G1 | 1 | 35.38253 |
| G2 | 6 | -6.04666 |
| G3 | 12 | 9.44052 |
| G4 | 18 | 16.91819 |

[Conditional Expression Correspondence Value]

Conditional expression (1) TLt/(fw × ft)$^{1/2}$ = 3.6039
Conditional expression (2) D1/ft = 0.1795
Conditional expression (3) D1/fw = 1.1432
Conditional expression (4) TLw/(fw × ft)$^{1/2}$ = 2.3822
Conditional expression (5) f3/ft = 0.1801
Conditional expression (6) R71/R81 = 0.9877
Conditional expression (7) (-f2)/f1 = 0.1709
Conditional expression (8) f4/fw = 3.0459
Conditional expression (9) f3a/(-f3b) = 0.7008

In this way, all conditional expressions (1) to (9) are satisfied in this example.

Figure 2B:
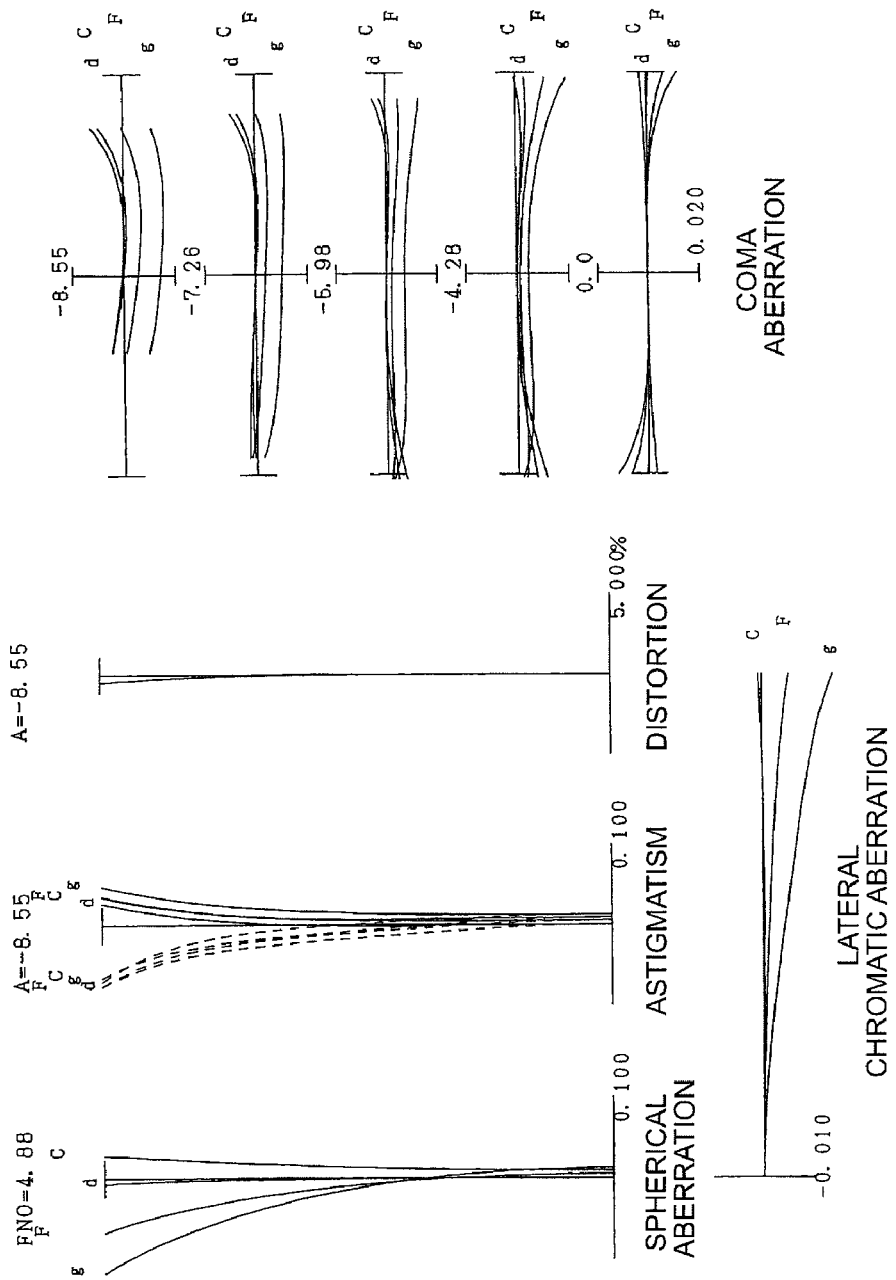
FIG. 2B shows graphs showing various aberrations of the zoom lens upon focusing on infinity in the intermediate focal length state.
Figure 2C:
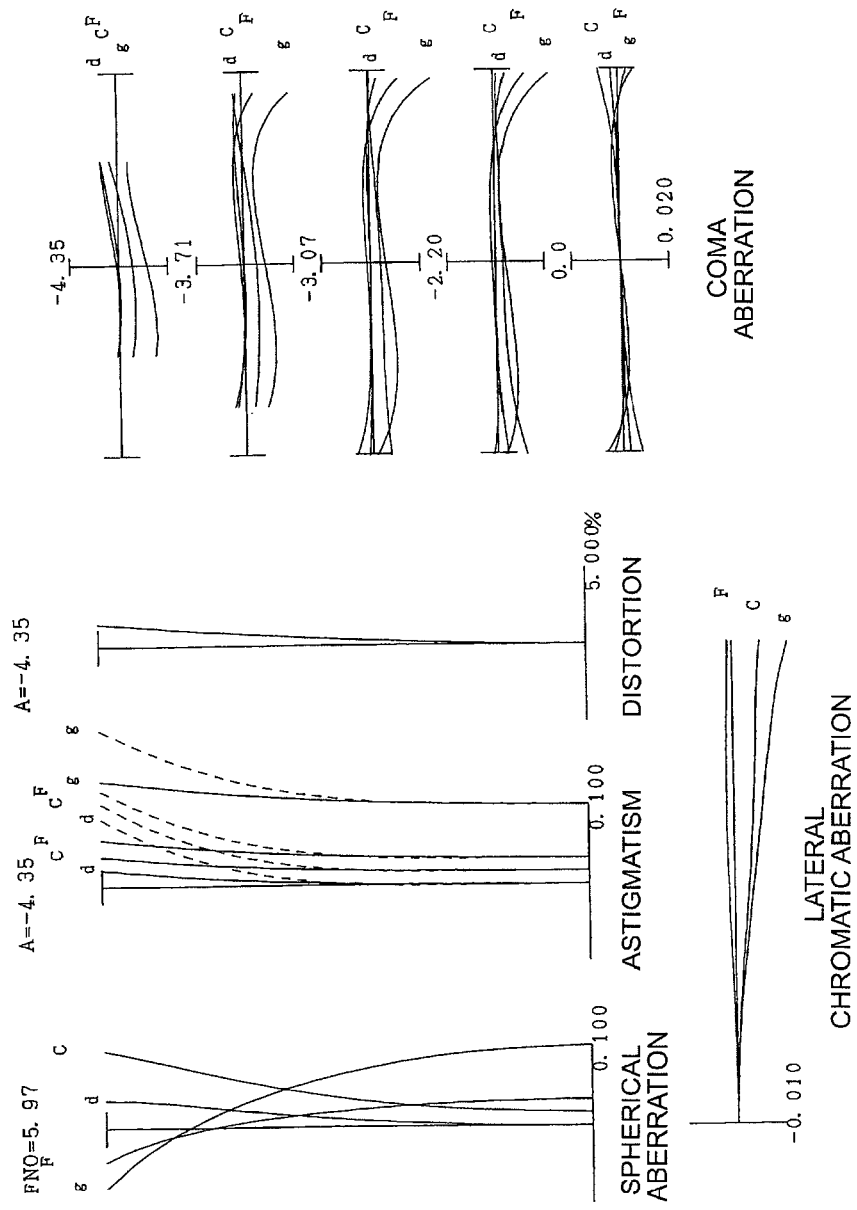
FIG. 2C shows graphs showing various aberrations of the zoom lens upon focusing on infinity in the telephoto end state.

FIG. 2A to 2C are graphs showing various aberrations of the zoom lens ZL according to First Example. In other words, FIG. 2A are graphs showing various aberrations of the zoom lens ZL upon focusing on infinity in the wide-angle end state (f=5.55 mm), FIG. 2B are graphs showing various aberrations of the zoom lens ZL upon focusing on infinity in the intermediate focal length state (f=27.07 mm), and FIG. 2C are graphs showing various aberrations of the zoom lens ZL upon focusing on infinity in the telephoto end state (f=52.43 mm). As seen in each graph showing aberrations, various Aberrations are corrected well in each focal length state from the wide-angle end state to the telephoto end state, indicating the presence of excellent optical performance. In each graph showing aberrations, FNO denotes an F number, and A denotes a half angle of view with respect to each image height. In each graph showing aberrations, d denotes d-line ($\lambda$=587.6 nm), g denotes g-line ($\lambda$=435.8 nm), C denotes C-line ($\lambda$=656.3 nm) and F denotes F-line ($\lambda$=486.1 nm). In the graph showing astigmatism, the solid line indicates the sagittal image surface, and the dotted line indicates the meridional image surface. The description on the graphs showing Aberrations is the same for other examples.

As seen in each graph showing aberrations, in First Example various aberrations are corrected well in each focal length state from the wide-angle end state to the telephoto end state, indicating the presence of excellent optical performance. As a result, excellent optical performance can be assured for a digital still camera 1, which has the zoom lens ZL of First Example, as well.

Second Example

Figure 3:
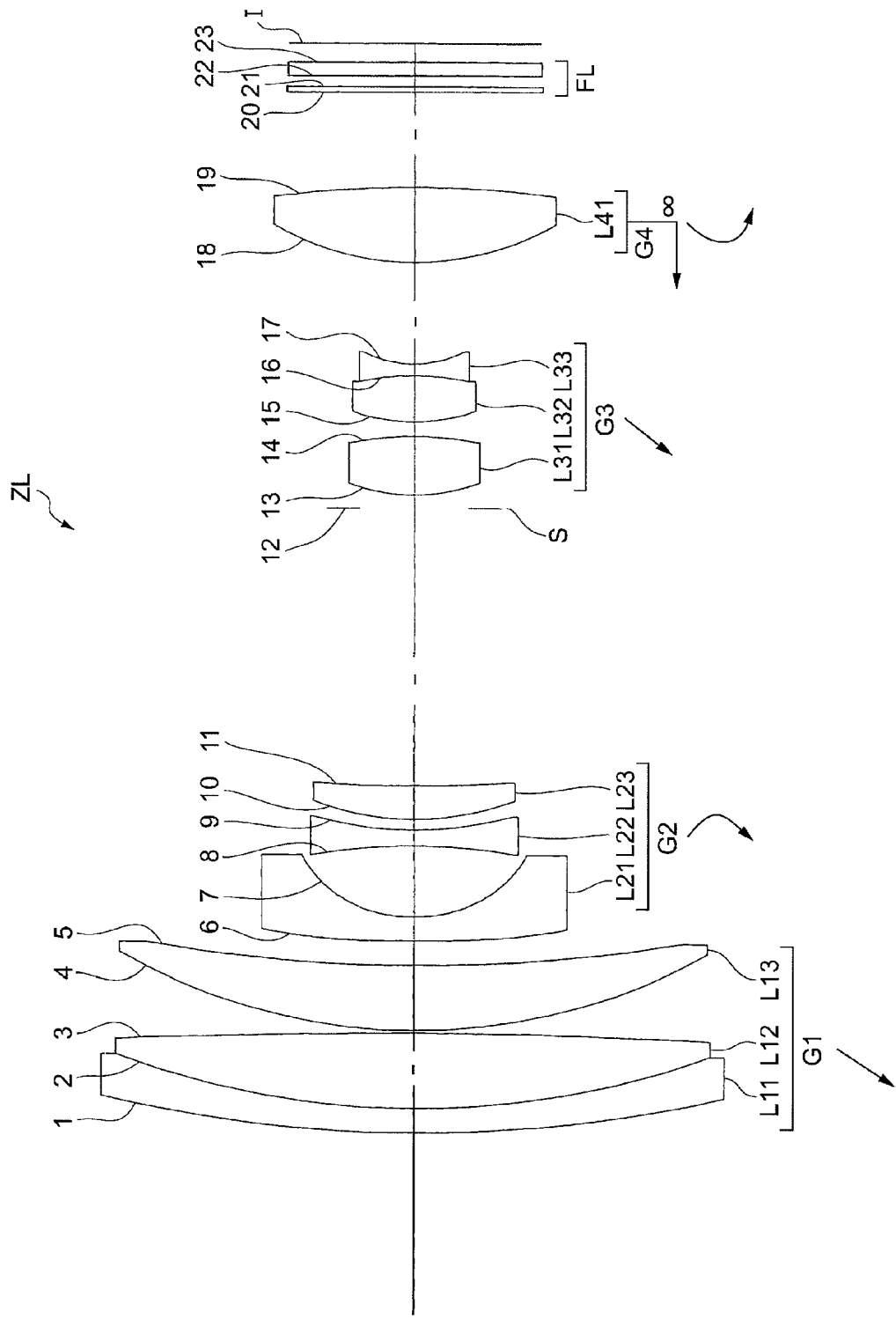
FIG. 3 is a diagram depicting a configuration and zoom focus of a zoom lens according to Second Example.

Second Example will now be described with reference to FIG. 3, FIG. 4 and Table 2. FIG. 3 is a diagram depicting a configuration and zoom locus of a zoom lens according to Second Example. The zoom lens of Second Example has a same configuration as the zoom lens of First Example, except for the position of the aspherical surface, therefore each composing element is denoted with a same reference symbol as First Example, and detailed description thereof is omitted. According to Second Example, the lens surfaces on both sides of the negative meniscus lens L21 of the second lens group G2 are aspherical, and the lens surface on the object side of the first positive lens L31 of the third lens group G3 is aspherical.

Table 2 shows each data of Second Example. The surface numbers 1 to 16 in Table 2 correspond to surfaces 1 to 23 in FIG. 3, and the group numbers G1 to G4 in Table 2 correspond to each lens group G1 to G4 in FIG. 3. In Second Example, the sixth lens surface, seventh lens surface and thirteenth lens surface are formed to be aspherical.

TABLE 2

[General Data]
Zoom ratio = 9.46

|   | Wide-angle | Intermediate | Telephoto |
|---|---|---|---|
| f = | 5.55 | 25.43 | 52.48 |
| FNO = | 3.58 | 4.79 | 5.86 |
| ω = | 37.60 | 9.05 | 4.35 |
| Y = | 4.05 | | |
| Bf = | 4.86977 | 10.50448 | 4.70677 |
| TL = | 40.76977 | 52.99243 | 61.40422 |
| TL' = | 41.01168 | 53.23434 | 61.64613 |

[Lens Data]

| N | R | D | nd | vd |
|---|---|---|---|---|
| 1 | 49.2257 | 0.9000 | 1.922860 | 20.88 |
| 2 | 31.1379 | 2.8000 | 1.497820 | 82.56 |
| 3 | −241.9161 | 0.1000 | | |
| 4 | 21.8050 | 2.4000 | 1.729157 | 54.68 |
| 5 | 57.9550 | (d5) | | |
| 6* | 66.9983 | 0.9000 | 1.851350 | 40.04 |
| 7* | 5.4606 | 2.6500 | | |
| 8 | −21.0780 | 0.6000 | 1.816000 | 46.62 |
| 9 | 13.1978 | 0.4000 | | |
| 10 | 10.1022 | 1.2500 | 1.945950 | 17.98 |
| 11 | 54.7575 | (d11) | | |
| 12 | ∞ | 0.5000 | Stop S | |
| 13* | 6.1623 | 2.2000 | 1.592520 | 67.87 |
| 14 | −12.3085 | 0.5500 | | |
| 15 | 6.6513 | 1.7000 | 1.729157 | 54.68 |
| 16 | −9.9468 | 0.4500 | 1.850260 | 32.35 |
| 17 | 3.8922 | (d17) | | |
| 18 | 10.2562 | 2.8000 | 1.487490 | 70.45 |
| 19 | −39.5485 | (d19) | | |
| 20 | ∞ | 0.2100 | 1.516800 | 64.12 |
| 21 | ∞ | 0.3900 | | |
| 22 | ∞ | 0.5000 | 1.516800 | 64.12 |
| 23 | ∞ | | | |

[Aspherical Data]

Sixth surface

κ = 1.000, A4 = 3.38150E−04, A6 = −3.98190E−06,
A8 = 0.00000E+00, A10 = 0.00000E+00

Seventh surface

κ = 0.8569, A4 = 5.90850E−04, A6 = 3.65740E−05,
A8 = −3.23810E−07, A10 = 7.98740E−08

Thirteenth surface

κ = 0.3200, A4 = −5.13470E−04, A6 = 0.00000E+00,
A8 = 0.00000E+00, A10 = 0.00000E+00

[Variable Distance Data]

|   | Wide-angle | Intermediate | Telephoto |
|---|---|---|---|
| f = | 5.5501 | 25.4311 | 52.4838 |
| d5 = | 0.9000 | 15.2594 | 20.3998 |
| d11 = | 10.4000 | 1.6003 | 0.7001 |
| d17 = | 4.4000 | 5.4283 | 15.3976 |
| d19 = | 3.5281 | 9.2214 | 3.2690 |

[Zoom Lens Group Data]

| Group number | First surface of group | Focal length of group |
|---|---|---|
| G1 | 1 | 35.22017 |
| G2 | 6 | −5.97699 |
| G3 | 12 | 9.55574 |
| G4 | 18 | 17.01991 |

[Conditional Expression Correspondence Value]

Conditional expression (1) TLt/(fw × ft)$^{1/2}$ = 3.6120
Conditional expression (2) D1/ft = 0.1760
Conditional expression (3) D1/fw = 1.1171
Conditional expression (4) TLw/(fw × ft)$^{1/2}$ = 2.4030
Conditional expression (5) f3/ft = 0.1821
Conditional expression (6) R71/R81 = 0.9265
Conditional expression (7) (−f2)/f1 = 0.1697
Conditional expression (8) f4/fw = 3.0666
Conditional expression (9) f3a/(−f3b) = 0.6592

In this way, all conditional expressions (1) to (9) are satisfied in this example.

Figure 4A:
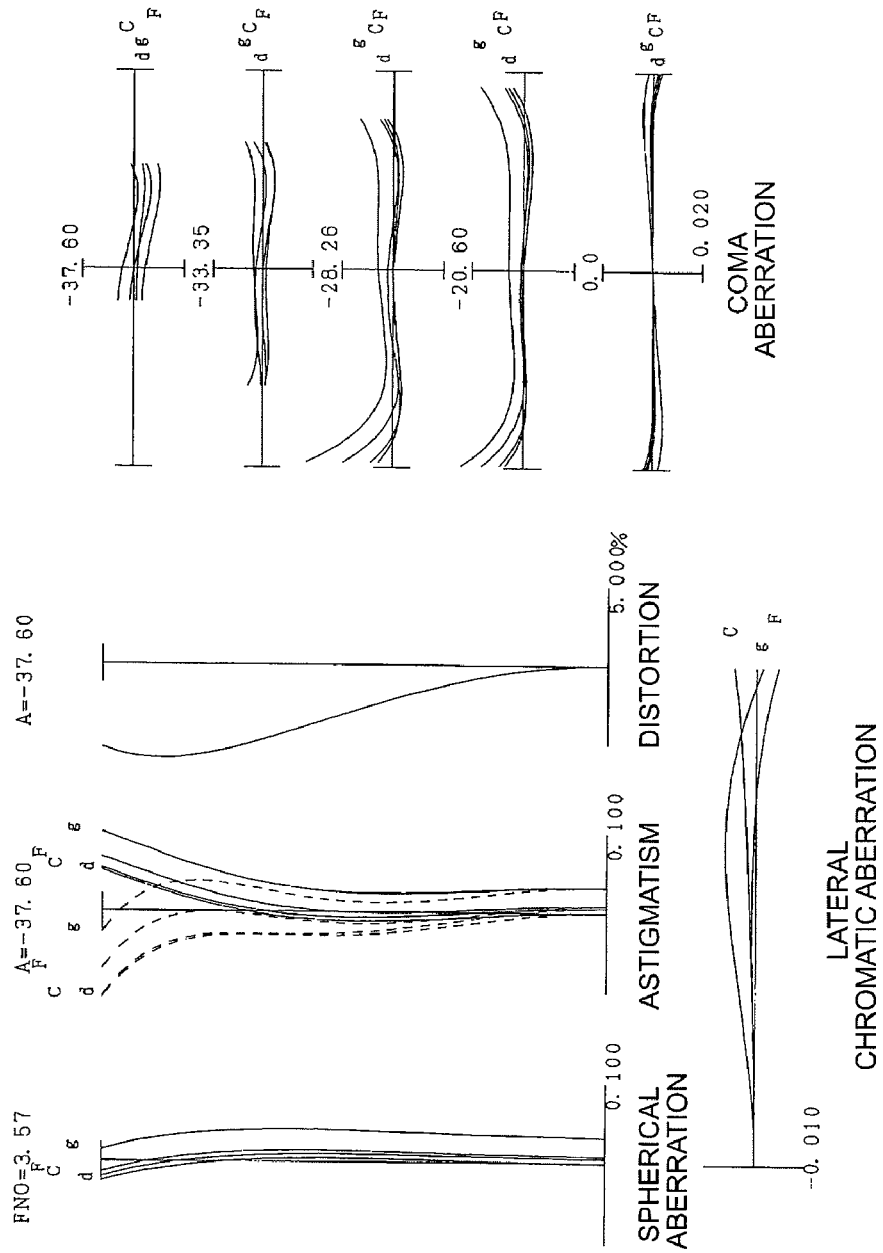
FIG. 4A shows graphs showing various aberrations of the zoom lens according to Second Example upon focusing on infinity in the wide-angle end state.
Figure 4B:
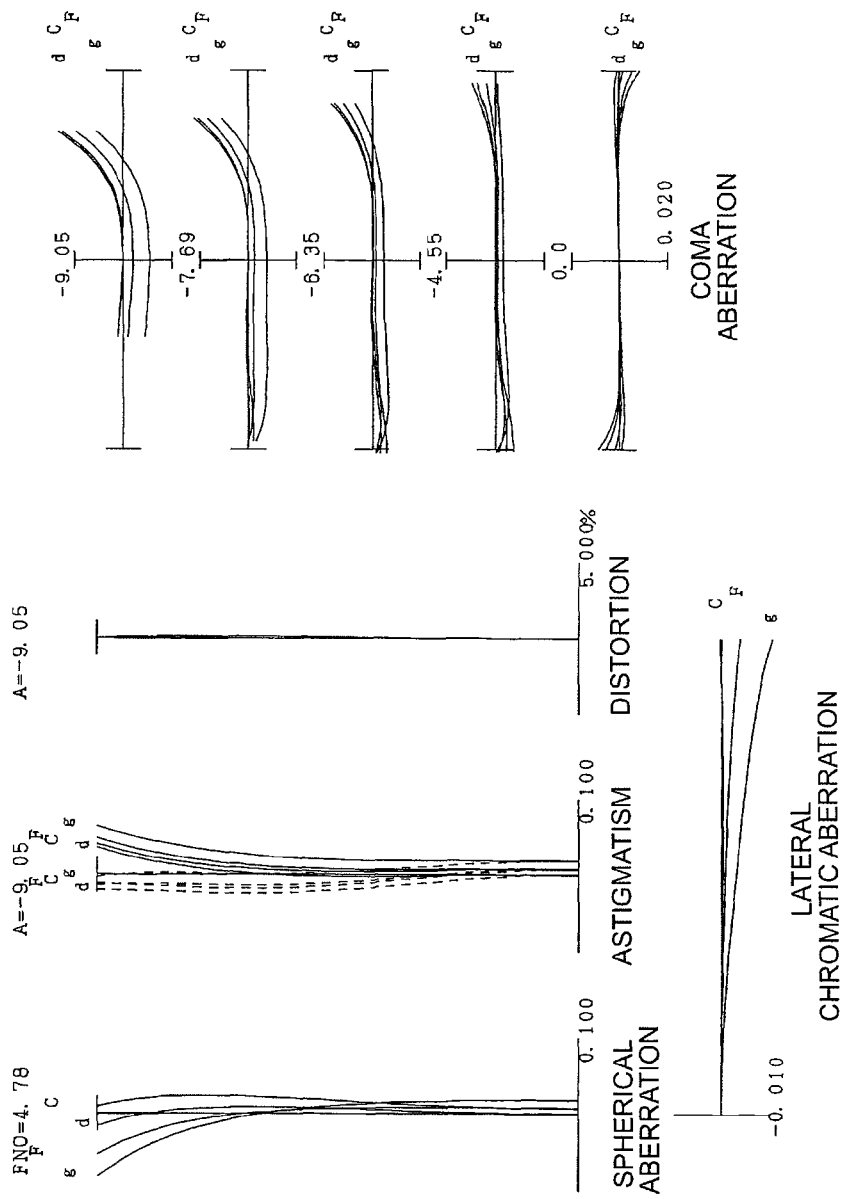
FIG. 4B shows graphs showing various Aberrations of the zoom lens upon focusing on infinity in the intermediate focal length state.
Figure 4C:
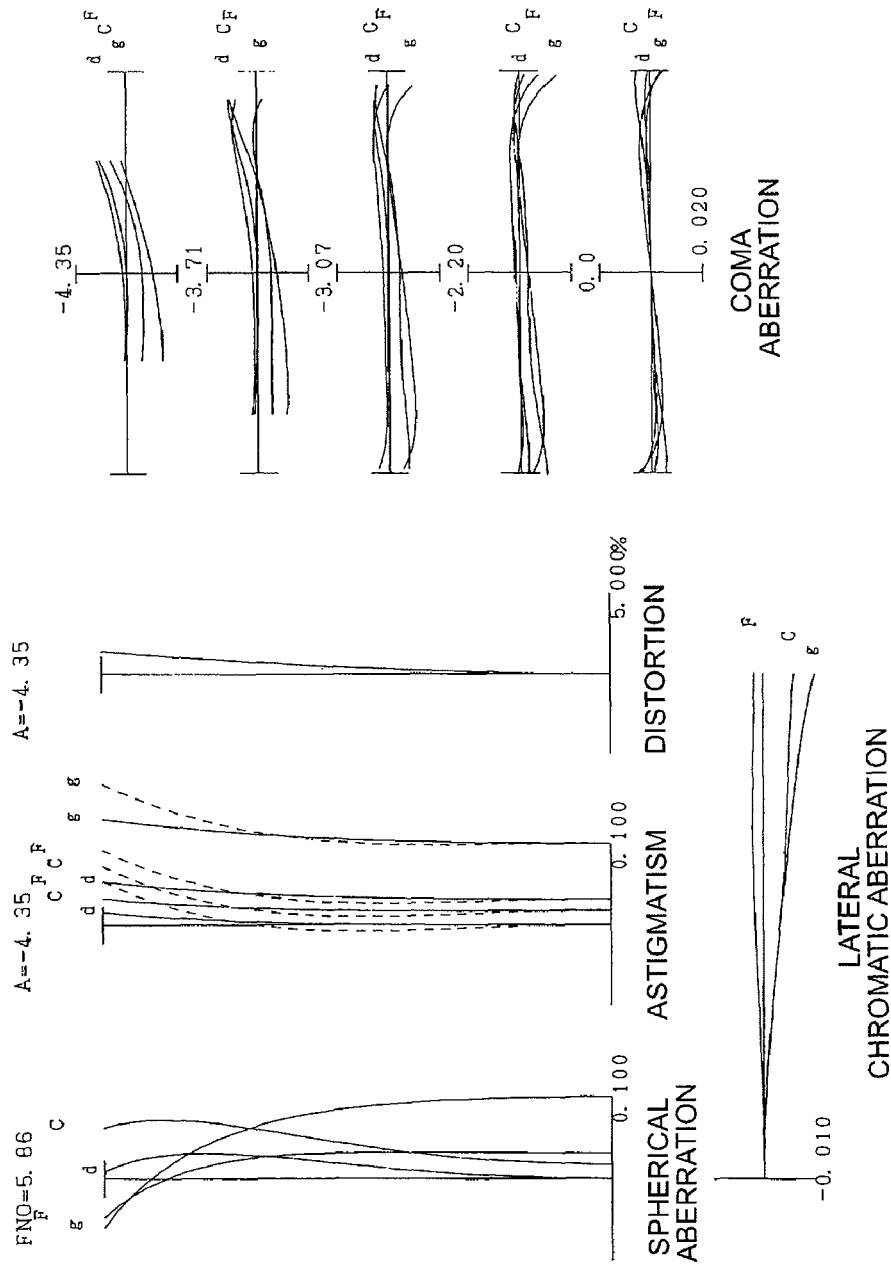
FIG. 4C shows graphs showing various aberrations of the zoom lens upon focusing on infinity in the telephoto end state.

FIG. 4A to 4C are graphs showing various aberrations of the zoom lens ZL according to Second Example. In other words, FIG. 4A are graphs showing various aberrations of the zoom lens ZL upon focusing on infinity in the wide-angle end state (f=5.55 mm), FIG. 4B are graphs showing various aberrations of the zoom lens ZL upon focusing on infinity in the intermediate focal length state (f=25.43 mm), and FIG. 4C are graphs showing various aberrations of the zoom lens ZL upon focusing on infinity in the telephoto end state (f=52.48 mm). As seen in each graph showing aberrations, in Second Example various aberrations are corrected well in each focal length state from the wide-angle end state to the telephoto end state, indicating the presence of excellent optical performance. As a result, excellent optical performance can be assured for a digital still camera 1, which has the zoom lens ZL of Second Example, as well.

Third Example

Figure 5:
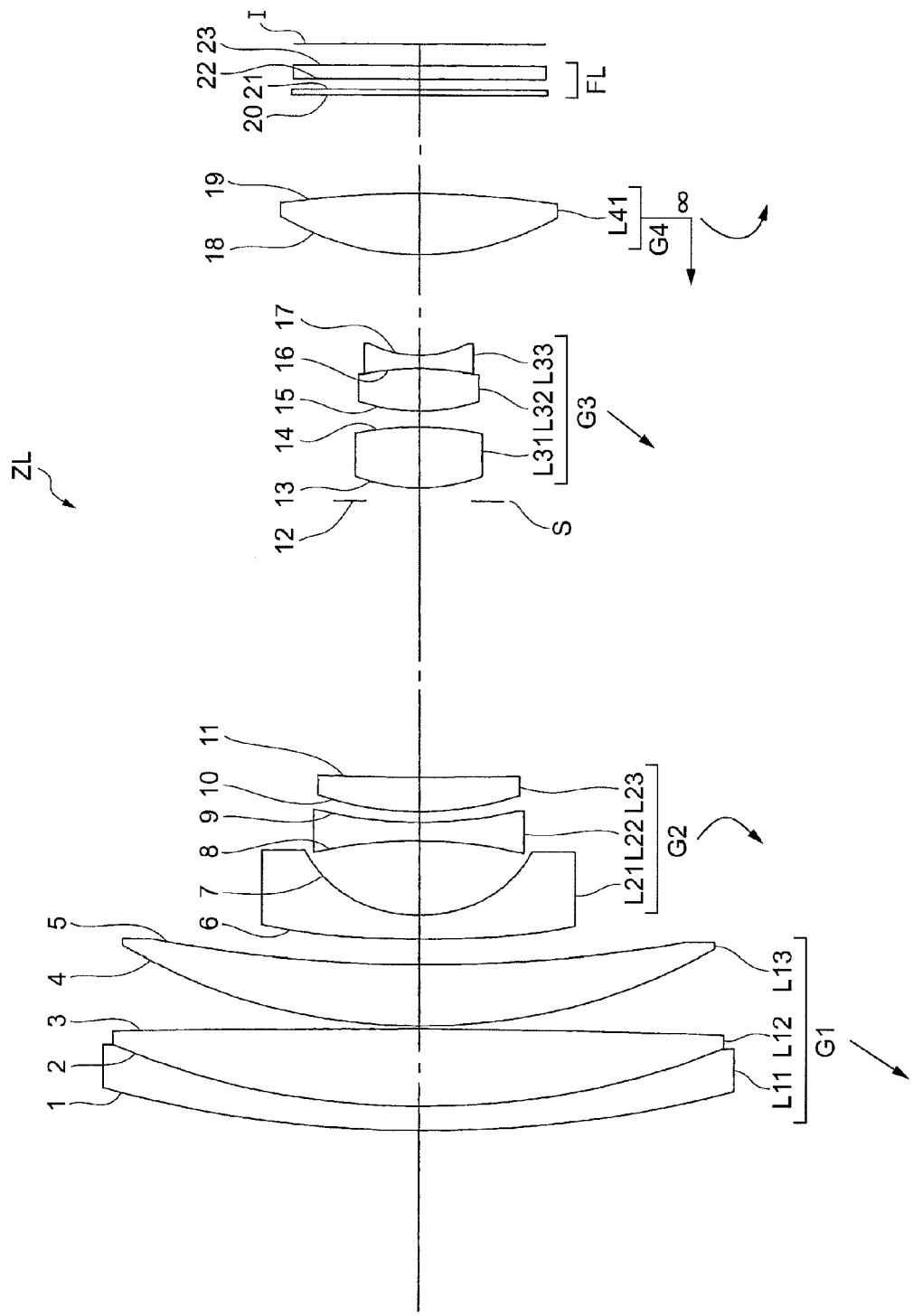
FIG. 5 is a diagram depicting a configuration and zoom focus of a zoom lens according to Third Example.

Third Example will now be described with reference to FIG. 5, FIG. 6 and Table 3. FIG. 5 is a diagram depicting a configuration and zoom locus of a zoom lens according to Third Example. The zoom lens of Third Example has a same configuration as the zoom lens of First Example, except for the position of the aspherical surface, therefore each composing element is denoted with a same reference symbol as First Example, and detailed description thereof is omitted. According to Third Example, the lens surfaces on both sides of the negative meniscus lens L21 of the second lens group G2 are aspherical, and the lens surface on the object side of the first positive lens L31 of the third lens group G3 is aspherical.

Table 3 shows each data of Third Example. The surface numbers 1 to 23 in Table 3 correspond to surfaces 1 to 23 in FIG. 5, and the group numbers G1 to G4 in Table 3 correspond to each lens group G1 to G4 in FIG. 5. In Third Example, the sixth lens surface, seventh lens surface and thirteenth lens surface are formed to be aspherical.

TABLE 3

Zoom ratio = 9.61

|  | Wide-angle | Intermediate | Telephoto |
|---|---|---|---|
| f = | 5.46 | 20.47 | 52.49 |
| FNO = | 3.65 | 4.80 | 5.79 |
| ω = | 38.24 | 11.16 | 4.35 |
| Y = | 4.05 |  |  |
| Bf = | 5.12260 | 11.20722 | 4.57834 |
| TL = | 40.99720 | 50.15359 | 61.47834 |
| TL' = | 41.23896 | 50.39536 | 61.72010 |

[Lens Data]

| N | R | D | nd | νd |
|---|---|---|---|---|
| 1 | 45.3182 | 0.9000 | 1.922860 | 20.88 |
| 2 | 29.7434 | 2.9000 | 1.497820 | 82.56 |
| 3 | −450.1867 | 0.1000 |  |  |
| 4 | 21.8357 | 2.3000 | 1.729157 | 54.68 |
| 5 | 54.6834 | (d5) |  |  |
| 6* | 50.1160 | 0.9000 | 1.851350 | 40.04 |
| 7* | 5.3592 | 2.800 |  |  |
| 8 | −16.5814 | 0.7000 | 1.816000 | 46.62 |
| 9 | 15.7831 | 0.4000 |  |  |
| 10 | 11.4902 | 1.3000 | 1.945950 | 17.98 |
| 11 | 141.4044 | (d11) |  |  |
| 12 | ∞ | 0.5000 | Stop S |  |
| 13* | 6.0688 | 2.3000 | 1.592520 | 67.87 |
| 14 | −11.6511 | 0.6000 |  |  |
| 15 | 6.7947 | 1.6000 | 1.696797 | 55.53 |
| 16 | −10.0461 | 0.5000 | 1.850260 | 32.35 |
| 17 | 3.9754 | (d17) |  |  |
| 18 | 9.8672 | 2.3000 | 1.487490 | 70.45 |
| 19 | −36.4960 | (d19) |  |  |
| 20 | ∞ | 0.2100 | 1.516330 | 64.14 |
| 21 | ∞ | 0.3900 |  |  |
| 22 | ∞ | 0.5000 | 1.516330 | 64.14 |
| 23 | ∞ |  |  |  |

[Aspherical Data]

Sixth surface

κ = 1.0000, A4 = 2.56400E−04, A6 = −2.53200E−06,
A8 = 0.00000E+00, A10 = 0.00000E+00
Seventh surface κ = 0.6617, A4 = 6.09560E−04, A6 = 4.51350E−05,
A8 = −1.27940E−06, A10 = 1.24520E−07

TABLE 3-continued

Thirteenth surface

κ = 0.1498, A4 = −4.34260E−04, A6 = −2.92700E−06,
A8 = 0.00000E+00, A10 = 0.00000E+00

[Variable Distance Data]

|  | Wide-angle | Intermediate | Telephoto |
|---|---|---|---|
| f = | 5.4578 | 20.4725 | 52.4869 |
| d5 = | 0.9500 | 13.2396 | 21.5000 |
| d11 = | 10.4246 | 1.7876 | 0.7000 |
| d17 = | 4.4000 | 3.8191 | 14.6000 |
| d19 = | 3.6741 | 9.6765 | 3.1145 |

[Zoom Lens Group Data]

| Group number | First surface of group | Focal length of group |
|---|---|---|
| G1 | 1 | 36.21604 |
| G2 | 6 | −6.03394 |
| G3 | 12 | 9.68525 |
| G4 | 18 | 16.19640 |

[Conditional Expression Correspondence Value]

Conditional expression (1) $TLt/(fw \times ft)^{1/2}$ = 3.6466
Conditional expression (2) D1/ft = 0.1712
Conditional expression (3) D1/fw = 1.1360
Conditional expression (4) $TLw/(fw \times ft)^{1/2}$ = 2.4365
Conditional expression (5) f3/ft = 0.1845
Conditional expression (6) R71/R81 = 0.8932
Conditional expression (7) (−f2)/f1 = 0.1666
Conditional expression (8) f4/fw = 2.9676
Conditional expression (9) f3a/(−f3b) = 0.7028

In this way, all conditional expressions (1) to (9) are satisfied in this example.

Figure 6A:
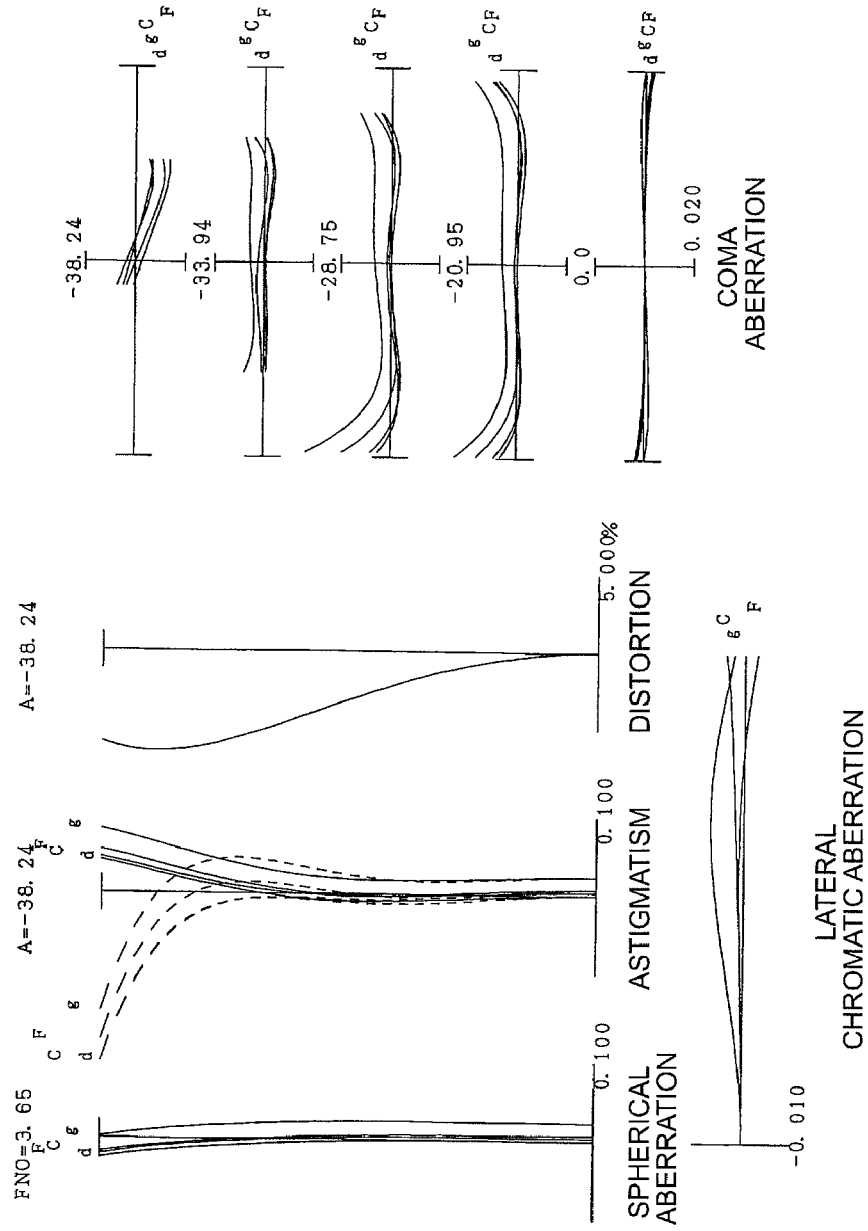
FIG. 6A shows graphs showing various aberrations of the zoom lens according to Third Example upon focusing on infinity in the wide-angle end state.
Figure 6B:
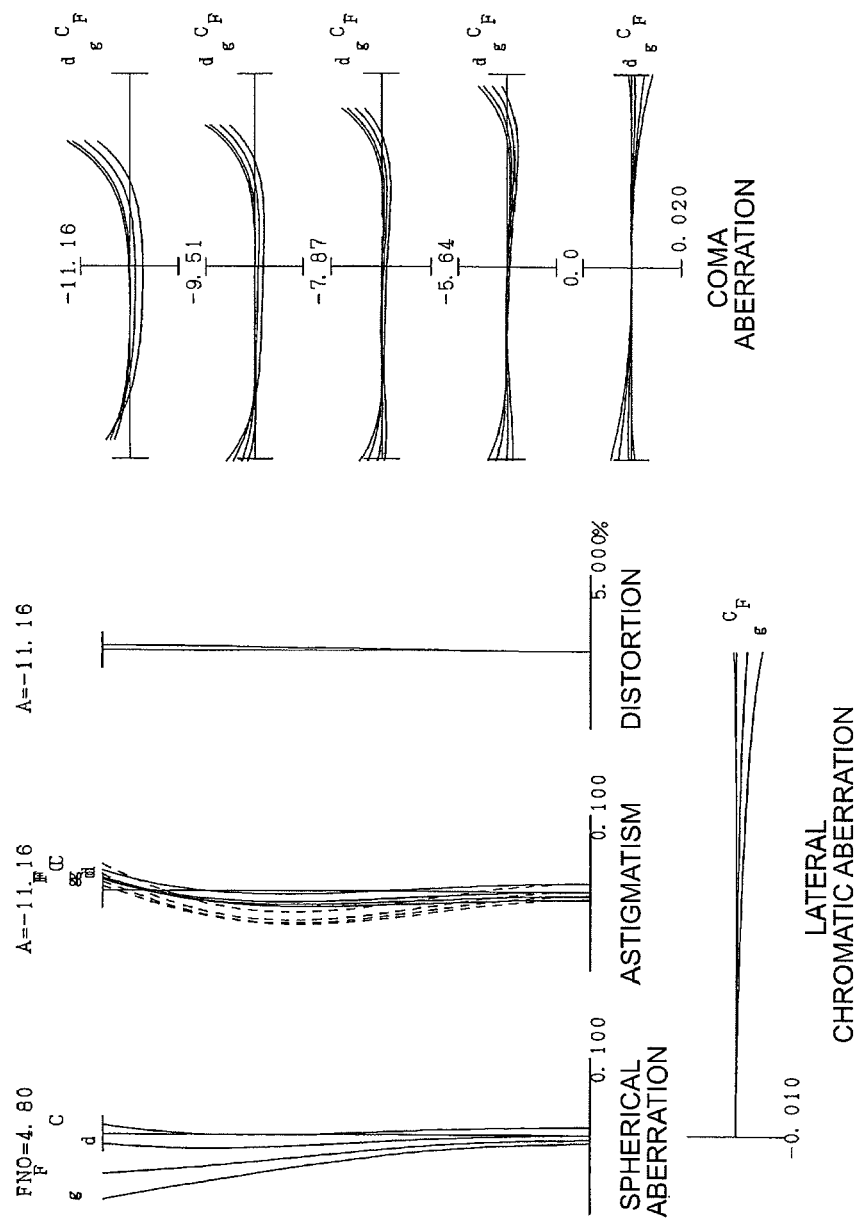
FIG. 6B shows graphs showing various aberrations of the zoom lens upon focusing on infinity in the intermediate focal length state.
Figure 6C:
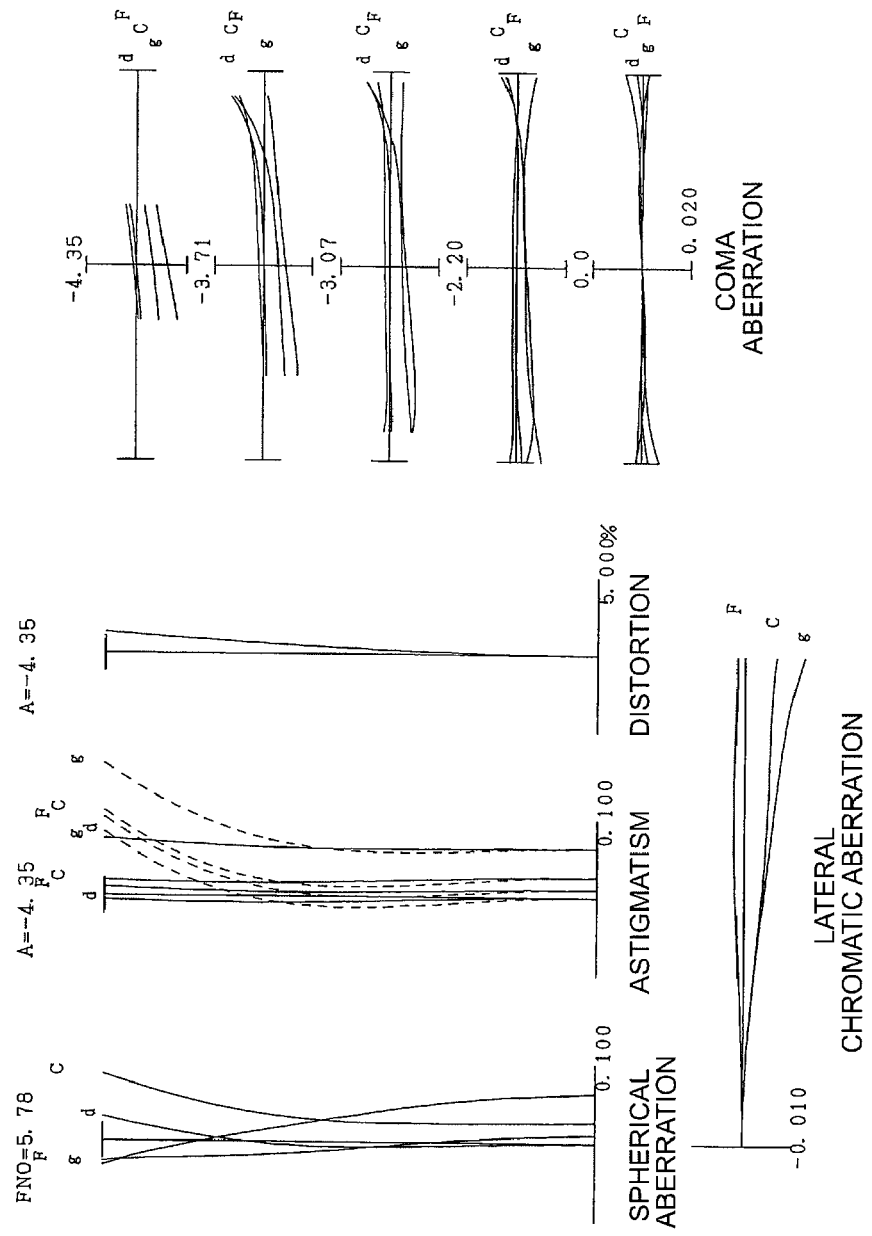
FIG. 6C shows graphs showing various aberrations of the zoom lens upon focusing on infinity in the telephoto end state.

FIG. 6A to 6C are graphs showing various aberrations of the zoom lens ZL according to Third Example. In other words, FIG. 6A are graphs showing various aberrations of the zoom lens ZL upon focusing on infinity in the wide-angle end state (f=5.46 mm), FIG. 6B are graphs showing various aberrations of the zoom lens ZL upon focusing on infinity in the intermediate focal length state (f=20.47 mm), and FIG. 6C are graphs showing various aberrations of the zoom lens ZL upon focusing on infinity in the telephoto end state (f=52.49 mm). As seen in each graph showing aberrations, in Third Example various aberrations are corrected well in each focal length state from the wide-angle end state to the telephoto end state, indicating the presence of excellent optical performance. As a result, excellent optical performance can be assured for a digital still camera 1, which has the zoom lens ZL of Third Example, as well.

According to each example, a zoom lens and optical apparatus (digital still camera), which is suitable for high pixel electronic picture elements, and has excellent optical performance with about an ×10 of zoom ratio, while decreasing thickness in the retracted state, can be implemented.

In the above embodiment, the following content can be adopted within a range where the optical performance is not diminished.

In each of the above mentioned examples, a zoom lens comprised of four lens groups was shown, but the present invention can be applied to a configuration using a different number of lens groups, such as five lens groups. In the configuration, a lens or a lens group may be added to the side closest to the object, or a lens or a lens group may be added to the side closest to the image. A lens group refers to a portion having at least one lens isolated by an air distance which changes upon zooming.

A single or plurality of lens group(s) or a partial lens group may be designed to be a focusing lens group which performs focusing from an object at infinity to an object to close distance by moving in the optical axis direction. This focusing lens group can be applied to auto focus, and is also suitable for driving a motor for auto focusing (e.g. driving using an ultrasonic motor). It is particularly preferable that the fourth lens group is designed to be the focusing lens group.

A lens group or a partial lens group may be designed to be a vibration-isolating lens group, which corrects image blurs generated by hand motion by moving the lens group or the partial lens group so as to have components vertical to the optical axis, or rotating (oscillating) the lens group or the partial lens group in an in-plane direction, including the optical axis. It is particularly preferable that at least a part of the second lens group or the third lens group is designed to be the vibration-isolating lens group.

The lens surface may be formed to be a spherical surface or plane, or an aspherical surface. If the lens surface is a spherical surface or plane, then lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite aspherical surface generated by forming a resin on the surface of the glass to be an aspherical shape. The lens surface may be a diffraction surface, and the lens may be a refractive index distributed lens (GRIN lens) or plastic lens.

It is preferable that the aperture stop is disposed near the third lens group, but the role of the aperture stop may be substituted by the frame of the lens, without disposing an element as the aperture stop.

Each lens surface may be coated by an anti-reflection film which has high transmittance in a wide wavelength region, in order to decrease flares and ghosts, and implement a high optical performance with high contrast.

The zoom ratio of the zoom lens (zooming optical system) of the present embodiment is about 7 to 15.

In the zoom lens (zooming optical system) of the present invention, it is preferable that the first lens group has two positive lens components. It is preferable that the second lens group has one positive lens component and two negative lens components. At this time, it is preferable that the lens components are disposed, in order from the object, to be in the sequence of negative, negative and positive with air distance there between. It is preferable that the third lens group has one positive lens component and one negative lens component. At this time, it is preferable that the lens components are disposed, in order from the object, to be in the sequence of positive and negative. It is preferable that the fourth lens group has one positive lens component.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising, in order from an object, a first lens group having positive refractive power, a second lens group having negative refractive power, a third lens group having positive refractive power, and a fourth lens group having positive refractive power, a distance between the first lens group and the second lens group being changed and a distance between the second lens group and the third lens group being changed upon zooming from a wide-angle end state to a telephoto end state, the first lens group comprising three lenses,
the second lens group comprising three lenses,
the third lens group comprising three lenses, and
the following conditional expressions being satisfied:

$$2.70 < TLt/(fw \times ft)^{1/2} < 3.70$$

$$0.05 < D1/ft < 0.29$$

$$1.00 < D1/fw < 1.50$$

where, TLt denotes a total length of the zoom lens in the telephoto end state, fw denotes a focal length of the zoom lens in the wide-angle end state, ft denotes a focal length of the zoom lens in the telephoto end state, and D1 denotes a thickness of the first lens group on the optical axis.

2. The zoom lens according to claim 1, wherein the first lens group comprises, in order from the object, a cemented lens of a negative lens and a positive lens, and a positive lens.

3. The zoom lens according to claim 1, wherein the third lens group comprises, in order from the object, a first positive lens, a second positive lens and a negative lens.

4. The zoom lens according to claim 1, wherein the fourth lens group moves to the object side before moving to the image side, upon zooming from the wide-angle end state to the telephoto end state.

5. The zoom lens according to claim 1, wherein
the first lens group comprises, in order from the object, a cemented lens of a negative lens and a positive lens, and a positive lens,
the third lens group comprises, in order from the object, a first positive lens, a second positive lens and a negative lens, and
the fourth lens group moves to the object side before moving to the image side, upon zooming from the wide-angle end state to the telephoto end state.

6. The zoom lens according to claim 1, wherein the following conditional expression is satisfied:

$$2.20 < TLw/(fw \times ft)^{1/2} < 2.50$$

where, TLw denotes a total length of the zoom lens in a wide-angle end state.

7. The zoom lens according to claim 1, wherein the following conditional expression is satisfied:

$$0.13 < f3/ft < 0.23$$

where, f3 denotes a focal length of the third lens group.

8. The zoom lens according to claim 1, wherein the following conditional expression is satisfied:

$$0.50 < R71/R81 < 2.00$$

where, R71 denotes a radius of curvature at the object side of the first positive lens in the third lens group, and R81 denotes a radius of curvature at the object side of the second positive lens in the third lens group.

9. The zoom lens according to claim 1, wherein a negative lens closest to the object in the second lens group is an aspherical lens.

10. The zoom lens according to claim 1, wherein the following conditional expression is satisfied:

$0.10 < (-f2)/f1 < 0.25$ where, f2 denotes a focal length of the second lens group, and f1 denotes a focal length of the first lens group.

11. The zoom lens according to claim 1, wherein the following conditional expression is satisfied:

$2.00 < f4/fw < 4.00$ where, f4 is a focal length of the fourth lens group.

12. The zoom lens according to claim 1, wherein
the third lens group is constituted by the first positive lens as a front group having positive power, and the second positive lens and the negative lens as a rear group having negative power, and the following conditional expression is satisfied:

$0.50 < f3a/(-f3b) < 1.00$ where, f3a denotes a focal length of the front group, and f3b denotes a focal length of the rear group.

13. The zoom lens according to claim 1, wherein the third lens group has an aspherical surface.

14. The zoom lens according to claim 1, wherein the distance between the first lens group and the second lens group increases, and the distance between the second lens group and the third lens group decreases, upon zooming from the wide-angle end state to the telephoto end state.

15. The zoom lens according to claim 1, wherein an aperture stop is disposed between the second lens group and the third lens group.

16. The zoom lens according to claim 1, wherein the aperture stop moves together with the third lens group upon zooming.

17. The zoom lens according to claim 1, wherein the second lens group comprises, in order from the object, a first negative lens, a second negative lens and a positive lens.

18. The zoom lens according to claim 1, wherein
the third lens group comprises, in order from the object, a first positive lens, a second positive lens and a negative lens, and
the second positive lens and the negative lens are cemented to be a cemented lens.

19. The zoom lens according to claim 1, wherein the fourth lens group is constituted by a single lens.

20. An optical apparatus comprising a zoom lens for forming an image of an object on a predetermined surface,
this zoom lens being the zoom lens according to claim 1.

21. A method for manufacturing a zoom lens having, in order from an object, a first lens group, a second lens group, a third lens group and a fourth lens group,
the method being executed such that:
three lenses are disposed as the first lens group, three lenses are disposed as the second lens group, and three lenses are disposed as the third lens group, with each lens being disposed so that the first lens group has positive refractive power, the second lens group has negative refractive power, the third lens group has positive refractive power, and the fourth lens group has positive refractive power,
each lens group is disposed so that a distance between the first lens group and the second lens group changes, and a distance between the second lens group and the third lens group changes, upon zooming from a wide-angle end state to a telephoto end state, and
each lens group is disposed so that the following conditional expressions are satisfied:

$2.70 < TLt/(fw \times ft)^{1/2} < 3.70$ $0.05 < D1/ft < 0.29$ $1.00 < D1/fw < 1.50$ where, TLt denotes a total length of the zoom lens in the telephoto end state, fw denotes a focal length of the zoom lens in the wide-angle end state, ft denotes a focal length of the zoom lens in the telephoto end state, and D1 denotes a thickness of the first lens group on an optical axis.

22. The method for manufacturing a zoom lens according to claim 20, wherein
the first lens group comprises, in order from the object, a cemented lens of a negative lens and a positive lens, and a positive lens,
the third lens group comprises, in order from the object, a first positive lens, a second positive lens and a negative lens, and
the fourth lens group moves to the object side before moving to the image side upon zooming from the wide-angle end state to the telephoto end state.

23. The method for manufacturing a zoom lens according to claim 20, wherein the following conditional expression is satisfied:

$2.20 < TLw/(fw \times ft)^{1/2} < 2.50$ where, TLw denotes a total length of the zoom lens in the wide-angle end state.

24. The method for manufacturing a zoom lens according to claim 20, wherein the following conditional expression is satisfied:

$0.13 < f3/ft < 0.23$ where, f3 denotes the focal length of the third lens group.

25. The method for manufacturing a zoom lens according to claim 20, wherein the following conditional expression is satisfied:

$0.50 < R71/R81 < 2.00$ where, R71 denotes a radius of curvature at the object side of the first positive lens in the third lens group, and R81 denotes a radius of curvature at the object side of the second positive lens in the third lens group.

26. A zoom lens comprising, in order from an object, a first lens group having positive refractive power, a second lens group having negative refractive power, a third lens group having positive refractive power, and a fourth lens group having positive refractive power, a distance between the first lens group and the second lens group being changed and a distance between the second lens group and the third lens group being changed upon zooming from a wide-angle end state to a telephoto end state,
the first lens group comprising three lenses,
the second lens group comprising three lenses,
the third lens group comprising three lenses, and
the following conditional expressions being satisfied:

$2.70 < TLt/(fw \times ft)^{1/2} < 3.70$ $0.05 < D1/ft < 0.29$ where, TLt denotes a total length of the zoom lens in the telephoto end state, fw denotes a focal length of the zoom lens in the wide-angle end state, ft denotes a focal length of the zoom lens in the telephoto end state, and D1 denotes a thickness of the first lens group on the optical axis, and
wherein a negative lens closest to the object in the second lens group is an aspherical lens.

* * * * *